US012412692B2

(12) United States Patent
Arai et al.

(10) Patent No.: US 12,412,692 B2
(45) Date of Patent: Sep. 9, 2025

(54) INDUCTOR ARRAY

(71) Applicant: TAIYO YUDEN CO., LTD., Tokyo (JP)

(72) Inventors: Takayuki Arai, Tokyo (JP); Naoya Terauchi, Tokyo (JP); Tomoo Kashiwa, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 677 days.

(21) Appl. No.: 17/849,927

(22) Filed: Jun. 27, 2022

(65) Prior Publication Data

US 2023/0052086 A1 Feb. 16, 2023

(30) Foreign Application Priority Data

Jul. 29, 2021 (JP) ................................ 2021-124851

(51) Int. Cl.
*H01F 17/04* (2006.01)
*H01F 27/24* (2006.01)
(Continued)

(52) U.S. Cl.
CPC ........... *H01F 17/04* (2013.01); *H01F 27/245* (2013.01); *H01F 27/2895* (2013.01)

(58) Field of Classification Search
CPC ..... H01F 17/04; H01F 27/245; H01F 27/2895
See application file for complete search history.

(56) References Cited

U.S. PATENT DOCUMENTS

2008/0012674 A1* 1/2008 Sano .................... H05K 1/0233 336/83
2019/0326046 A1* 10/2019 Ashizawa ............. H01F 27/306
(Continued)

FOREIGN PATENT DOCUMENTS

JP 2016-006830 A 1/2016
JP 2019-153649 A 9/2019
JP 2021-077714 A 5/2021

OTHER PUBLICATIONS

SMD Beads and Chokes [Application note] Extended range for EMI noise suppression, United States, October, pp. 1 40, the Internet, the Internet] FERROXCUBE,2006 < URL:https://ferroxcube.home.pl/appl/info/SMD-beads%20&%20chokes%20-%20content.pdf> (Year: 2006).*

(Continued)

*Primary Examiner* — Malcolm Barnes
(74) *Attorney, Agent, or Firm* — Pillsbury Winthrop Shaw Pittman, LLP

(57) ABSTRACT

An inductor array of the invention includes a magnetic base body, a first internal conductor within the base body, and a second internal conductor adjacent to the first internal conductor. The first and second internal conductors are arranged along a reference axis. The base body includes an inter-conductor region between the first and second internal conductors. The inter-conductor region has a first section cut along a reference plane including the reference axis, and a first reference axis direction dimension of the first section in the reference axis direction may be less than double a shortest distance between the first internal conductor and a surface of the base body in the reference plane. A first aspect ratio of the first section, which is a ratio of a first orthogonal direction dimension in a direction orthogonal to the reference axis to the first reference axis direction dimension, may be less than 1.

12 Claims, 12 Drawing Sheets

(51) Int. Cl.
*H01F 27/245* (2006.01)
*H01F 27/28* (2006.01)

(56) References Cited

U.S. PATENT DOCUMENTS

| | | | | |
|---|---|---|---|---|
| 2021/0104353 | A1* | 4/2021 | Yamauchi | H01F 17/04 |
| 2021/0134516 | A1* | 5/2021 | Yoshioka | H01F 27/2804 |
| 2021/0272736 | A1* | 9/2021 | Ashizawa | H01F 27/29 |
| 2021/0272745 | A1* | 9/2021 | Wang | H01F 27/292 |

OTHER PUBLICATIONS

Notice of Reasons for Refusal dated Apr. 15, 2025, issued in corresponding Japanese Patent Application No. 2021-124851, with English translation (13 pgs.).

* cited by examiner

INDUCTOR ARRAY

CROSS-REFERENCE TO RELATED APPLICATIONS

This application is based on and claims the benefit of priority from Japanese Patent Application Serial No. 2021-124851 (filed on Jul. 29, 2021), the contents of which are hereby incorporated by reference in their entirety.

TECHNICAL FIELD

The present disclosure relates to an inductor array, a circuit board including the inductor array, and an electronic device including the circuit board.

BACKGROUND

An inductor array including a plurality of inductors has been known. A plurality of inductors are packaged in a single chip to form such an inductor array. A conventional inductor array includes, for example, a magnetic base body made of a magnetic material, a plurality of internal conductors provided in the base body, and a plurality of external electrodes connected to respective ends of the plurality of internal conductors. Examples of the conventional inductor array are disclosed, for example, in Japanese Patent Application Publication No. 2016-006830 and Japanese Patent Application Publication No. 2019-153649 (the '649 Publication; see FIG. 4).

Since a plurality of inductors are packaged together, an inductor array has an advantage of requiring a small mounting space when mounted on a substrate. However, when the internal conductors included in the inductor array are arranged closer to each other, the magnetic coupling between the inductors is increased, and this makes it difficult for the inductors to exhibit desired characteristics. Therefore, in conventional inductor arrays designed such that each inductor functions as an independent inductor, a large distance is set between the internal conductors to reduce the magnetic coupling between the inductors. For example, in the inductor array 400 shown in FIG. 4 of the '649 Publication, the distance between the metal plates 12, which serve as internal conductors, is about three times as large as the distance from the metal plates 12 to the top surface of the molded body 10, which serves as a magnetic base body. In conventional inductor arrays including the inductor array of the '649 Publication, the distance between adjacent internal conductors is three or more times as large as the distance from the internal conductors to the surfaces of the magnetic base body. With such structure, the magnitude of the coupling coefficient, which represents magnetic coupling between the inductors, is set at about 0.2 or less, such that each inductor can exhibit desired characteristics.

When the magnetic base body surrounds the internal conductors with even thicknesses, the self-inductance of the inductors can be efficiently increased. Therefore, the distance between the internal conductors in an inductor array is preferably about one to two times as large as the distance from the internal conductors to the surfaces of the magnetic base body, so as to increase the self-inductance efficiently. However, as described above, when the distance between the internal conductors is reduced while maintaining the basic shape and structure of the conventional inductor arrays, the magnetic coupling between the inductors is unfavorably increased. The distance between the internal conductors in the conventional inductor arrays is thus two or more times as large as the distance from the internal conductors to the surfaces of the magnetic base body, so as to maintain, for each of the internal conductors, a distance equal to the distance from the internal conductor to the surfaces of the magnetic base body.

SUMMARY

One object of the present disclosure is to overcome or reduce at least a part of the above drawback. Specifically, one object of the invention is to reduce magnetic coupling between the inductors in an inductor array in which the distance between the internal conductors is less than two times as large as the distance from the internal conductors to the surfaces of the magnetic base body.

Other objects of the present invention will be made apparent through the entire description in the specification. The invention disclosed herein may address other drawbacks in addition to the drawback described above.

An inductor array according to one or more embodiments of the invention comprises: a magnetic base body having a first surface, a second surface opposed to the first surface, and a third surface connecting between the first surface and the second surface; a plurality of internal conductors having a same shape and arranged within the magnetic base body to be spaced apart from each other along a reference axis extending through the first surface and the second surface; a plurality of first external electrodes provided on the magnetic base body so as to be in contact at least with the third surface, each of the plurality of first external electrodes being connected to one end of associated one of the plurality of internal conductors; and a plurality of second external electrodes provided on the magnetic base body so as to be in contact at least with the third surface, each of the plurality of second external electrodes being connected to the other end of associated one of the plurality of internal conductors. In one or more embodiments of the invention, the plurality of internal conductors include a first internal conductor and a second internal conductor disposed adjacent to the first internal conductor, and the magnetic base body includes an inter-conductor region disposed between the first internal conductor and the second internal conductor and overlapping with both the first internal conductor and the second internal conductor as viewed from a reference axis direction along the reference axis. In one or more embodiments of the invention, the inter-conductor region has a first section cut along a reference plane including the reference axis and perpendicular to the third surface, and a first reference axis direction dimension of the first section in the reference axis direction is less than double a shortest distance between the first internal conductor and a surface of the magnetic base body in the reference plane. In one or more embodiments of the invention, a first aspect ratio of the first section is less than 1, the first aspect ratio being a ratio of a first orthogonal direction dimension in an orthogonal direction orthogonal to the reference axis to the first reference axis direction dimension. The first reference axis direction dimension may be equal to or larger than the distance between the first internal conductor and the fourth surface.

In one or more embodiments of the invention, the first internal conductor has a second section cut along the reference plane, and a second orthogonal direction dimension of the second section in the orthogonal direction is equal to the first orthogonal direction dimension.

In one or more embodiments of the invention, the magnetic base body has a fourth surface opposed to the third surface. A distance between the first internal conductor and the fourth surface may be equal to a distance between the second internal conductor and the fourth surface. A distance between the first internal conductor and the fourth surface may be smaller than a distance between the second internal conductor and the fourth surface.

In one or more embodiments of the invention, the first internal conductor has a second section cut along the reference plane, and a second orthogonal direction dimension of the second section in the orthogonal direction is larger than the first orthogonal direction dimension.

In one or more embodiments of the invention, the first internal conductor has a second section cut along the reference plane, and the first aspect ratio is smaller than a second aspect ratio of the second section, the second aspect ratio being a ratio of a second orthogonal direction dimension in the orthogonal direction to a second reference axis direction dimension in the reference axis direction.

In one or more embodiments of the invention, the second aspect ratio is larger than 1. In one or more embodiments of the invention, a magnitude of a coupling coefficient representing magnetic coupling between the first internal conductor and the second internal conductor is less than 0.2. A magnitude of a coupling coefficient representing magnetic coupling between the first internal conductor and the second internal conductor may be less than 0.1.

An embodiment of the present invention relates to a circuit board including any one of the above-described inductor arrays.

An embodiment of the present invention relates to an electronic device comprising the above circuit board.

Advantageous Effects

With the technique disclosed herein, it is possible to reduce magnetic coupling between the inductors in an inductor array in which the distance between the internal conductors is less than two times as large as the distance from the internal conductors to the surfaces of the magnetic base body.

DESCRIPTION OF EXAMPLE EMBODIMENTS

Figure 1:
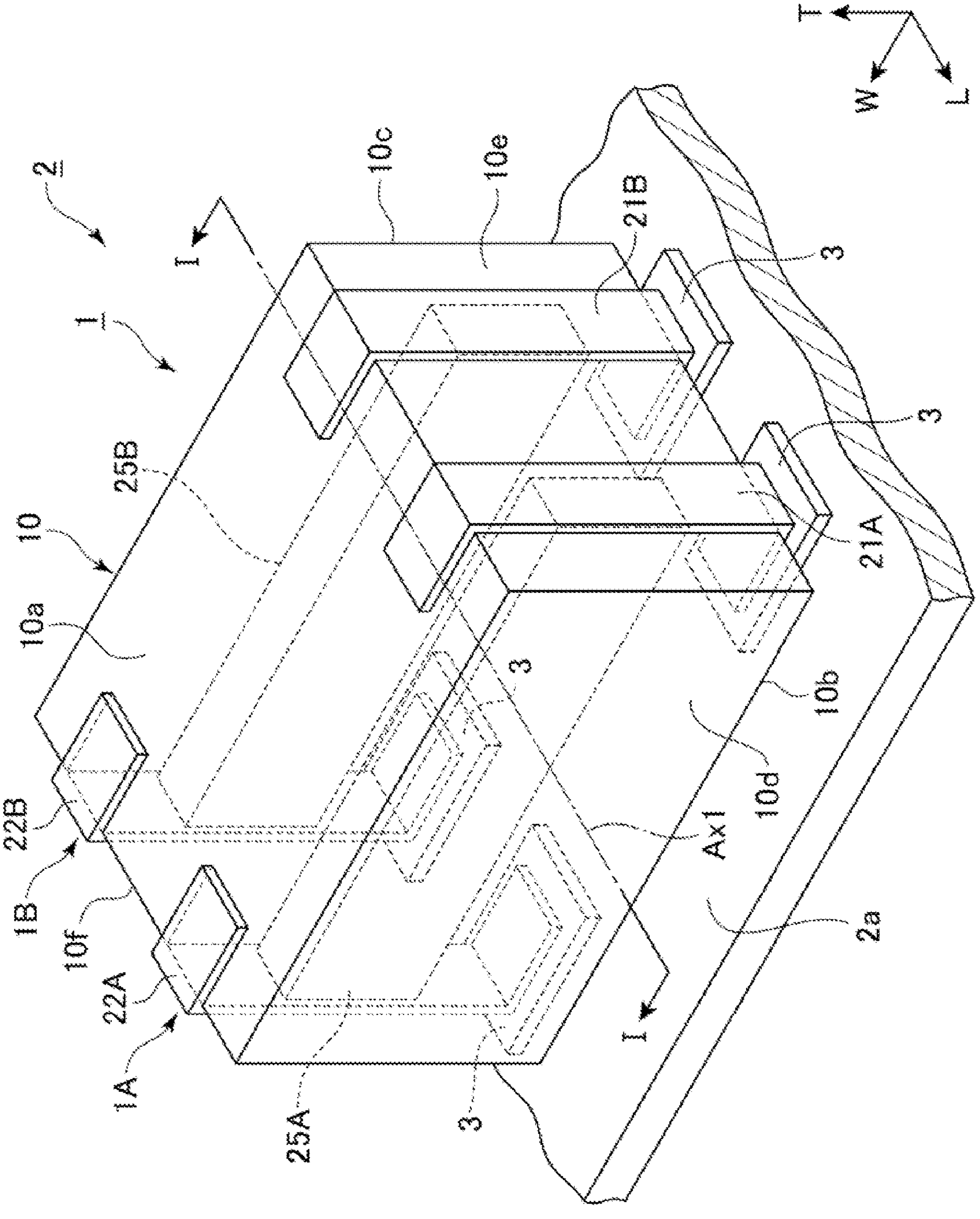
FIG. 1 is a perspective view of an inductor array according to one embodiment of the invention mounted on a mounting substrate.

Various embodiments of the present invention will be described hereinafter with reference to the appended drawings. Throughout the drawings, the same components are denoted by the same reference numerals. For convenience of explanation, the drawings are not necessarily drawn to scale. The following embodiments of the present invention do not limit the scope of the claims. The elements described in the following embodiments are not necessarily essential to solve the problem addressed by the invention.

Figure 2:
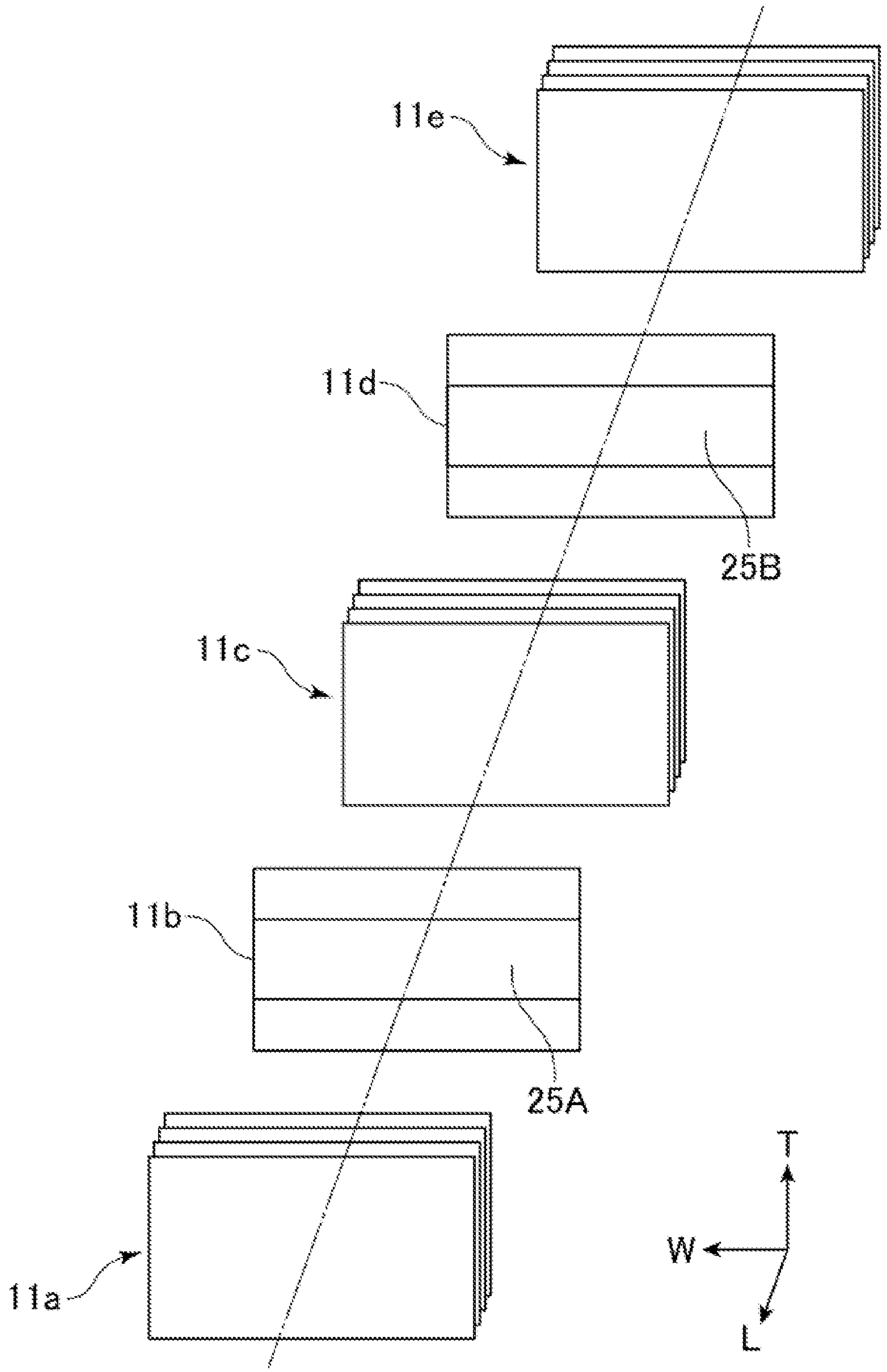
FIG. 2 is an exploded view of the inductor array of FIG. 1.
Figure 3:
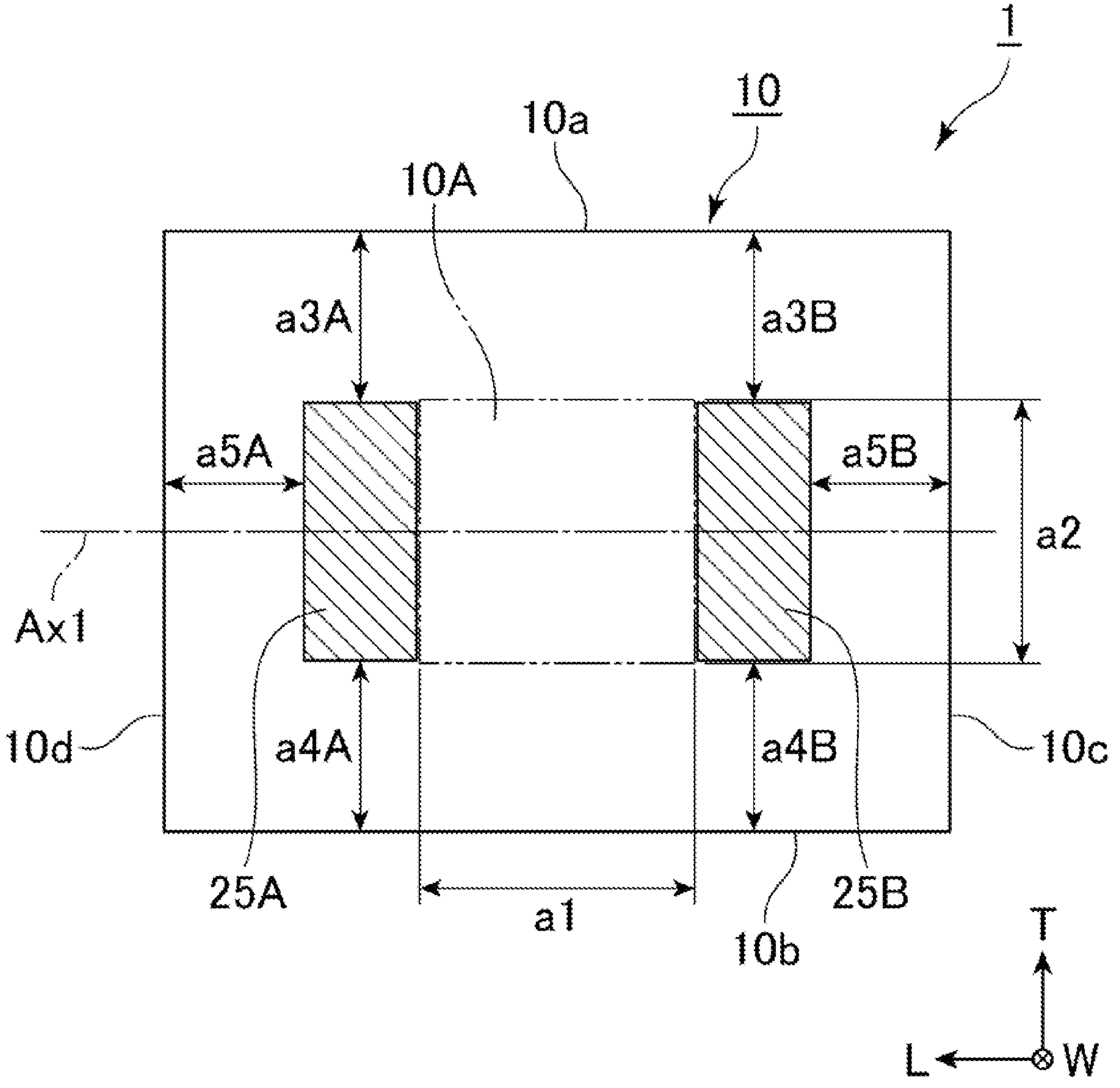
FIG. 3 is a sectional view schematically showing a section of the inductor array of FIG. 1 cut along the plane extending through a reference axis and perpendicular to the bottom surface of the magnetic base body.
Figure 4:
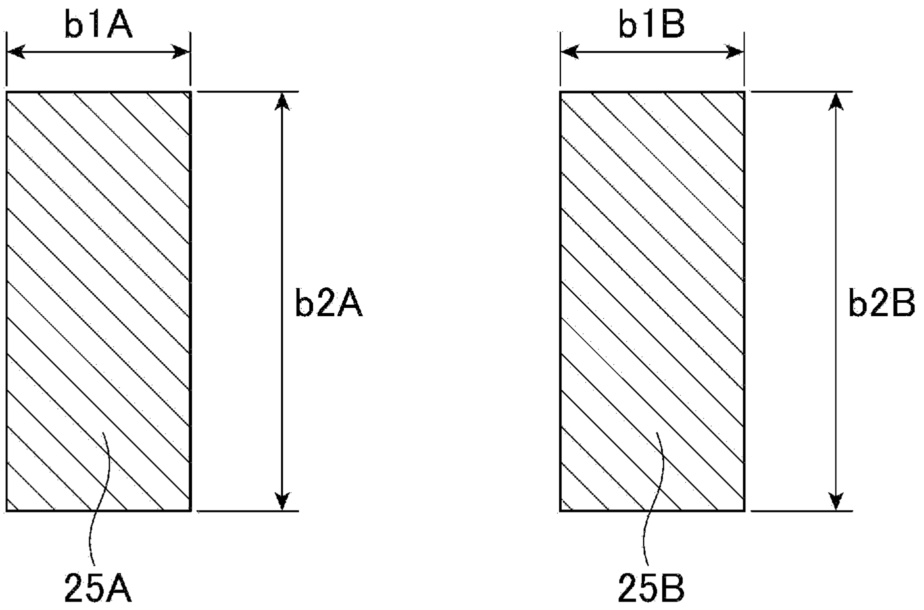
FIG. 4 is a sectional view showing a section of internal conductors included in the inductor array of FIG. 1.

An inductor array 1 according to one or more embodiments of the present invention will be described with reference to FIGS. 1 to 4. FIG. 1 is a perspective view of the inductor array 1 according to one embodiment of the present invention, and FIG. 2 is an exploded view of the inductor array 1. FIG. 3 is a schematic sectional view of the inductor array 1 along the I-I line, and FIG. 4 is a sectional view showing a section of internal conductors included in the inductor array 1.

Each of the drawings shows the L axis, the W axis, and the T axis orthogonal to one another. In this specification, the "length" direction, the "width" direction, and the "thickness" direction of the inductor array 1 are referred to as the L-axis direction, W-axis direction, and T-axis direction in FIG. 1, respectively, unless otherwise construed from the context.

As illustrated, the inductor array 1 includes a base body 10, internal conductors 25A and 25B provided in the base body 10, and external electrodes 21A, 21B, 22A, 22B provided on a surface of the base body 10. The internal conductor 25A is coupled to the external electrode 21A at one end thereof and to the external electrode 22A at the other end thereof. The internal conductor 25B is coupled to the external electrode 21B at one end thereof and to the external electrode 22B at the other end thereof. The internal conductor 25A is disposed at a distance from the internal conductor 25B in the L-axis direction. Thus, the inductor array 1 includes a first inductor including the internal conductor 25A and the external electrodes 21A and 22A, and a second inductor including the internal conductor 25B and the external electrodes 21B and 22B. The number of internal conductors disposed in the base body 10 is not limited to two. The base body 10 may contain any desired number of internal conductors.

In the inductor array 1 thus configured, the internal conductor 25A and the external electrodes 21A and 22A constitute an inductor 1A, and the internal conductor 25B and the external electrodes 21B and 22B constitute an inductor 1B. The inductor 1A preferably operates with no magnetic interference from the inductor 1B. Likewise, the inductor 1B preferably operates with no magnetic interference from the inductor 1A. Therefore, the inductor array 1 is configured such that the magnitude (absolute value) of the coupling coefficient between the inductor 1A and the inductor 1B is low. In one or more embodiments of the invention, the magnitude of the coupling coefficient between the inductor 1A and the inductor 1B is 0.2 or less. When a pair of inductors is configured as a common mode coil, the coupling coefficient between the pair of inductors is typically set at 0.4 or higher. Since the magnitude of the coupling coefficient between the inductor 1A and the inductor 1B is 0.2 or less, the inductor array 1 cannot function as a common mode coil. Thus, each of the inductor 1A and the inductor 1B of the inductor array 1 is configured to function as a separate inductor.

Each of the inductors 1A and 1B is used in, for example, a large-current circuit through which a large electric current flows. More specifically, the inductor array 1 may be an inductor used in a DC-to-DC converter (what is called a power inductor).

The inductor array 1 may be mounted on a mounting substrate 2*a*. The mounting substrate 2*a* has four land portions 3 provided thereon. When the inductor array 1 is mounted on the mounting substrate 2*a*, the four external electrodes 21A, 21B, 22A, 22B of the inductor array 1 are positioned to face the corresponding lands 3. The inductor array 1 may be mounted on the mounting substrate 2*a* by soldering the external electrodes 21A, 21B, 22A, 22B to the corresponding lands 3. Thus, a circuit board 2 includes the inductor array 1 and the mounting substrate 2*a* on which the inductor array 1 is mounted. In addition to the inductor array 1, various electronic components may be mounted on the mounting substrate 2*a*.

The circuit board 2 can be installed in various electronic devices. Electronic devices in which the circuit board 2 may be installed include smartphones, tablets, game consoles, servers, electrical components of automobiles, and various other electronic devices. The inductor array 1 may be a built-in component embedded in the mounting substrate 2*a*.

Since the inductor array 1 is formed as a single chip in which the inductor 1A with the internal conductor 25A and the external electrodes 21A, 22A and the inductor 1B with the internal conductor 25B and the external electrodes 21B, 22B are included, it is particularly suitable for small electronic devices that require high-density mounting of electronic components.

In the illustrated embodiment, the base body 10 has a substantially rectangular parallelepiped shape. In one embodiment of the invention, the base body 10 has a length (the dimension in the L-axis direction) of 0.6 mm to 10 mm, a width (the dimension in the W-axis direction) of 0.2 mm to 10 mm, and a thickness (the dimension in the T-axis direction) of 0.2 mm to 10 mm. The base body 10 has a first region situated on a positive side in the L-axis direction with respect to a predetermined boundary on the L-axis, and a second region situated on a negative side with respect to the boundary in the L-axis direction. The first region includes the internal conductor 25A, and the second region includes the internal conductor 25B. In this manner, the base body 10 has a plurality of regions, each of which has a single inductor. A region of the base body 10 containing a single inductor has a dimension in the L-axis direction of 0.1 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. Based on the position of the mounting substrate 2*a*, the first principal surface 10*a* lies on the top side of the base body 10, and therefore, the first principal surface 10*a* may be herein referred to as the "top surface," and the second principal surface 10*a* may be herein referred to as the "bottom surface." Each of the first principal surface 10*a*, the second principal surface 10*b*, the first side surface 10*e*, and the second side surface 10*f* connects the first end surface 10*c* to the second end surface 10*d*.

The inductor array 1 is disposed such that the first principal surface 10*a* or the second principal surface 10*b* faces the mounting substrate 2*a*. One of the principal surfaces that faces the mounting substrate 2*a*, either the first principal surface 10*a* or the second principal surface 10*b*, is herein referred to as a "mounting surface". In the illustrated embodiment, the second principal surface 10*b* faces the mounting substrate 2*a*, so the second principal surface 10*b* is the "mounting surface". Thus, the second principal surface 10*b* may be referred to as the "mounting surface 10*b*." Since the "mounting surface" of the base body 10 is the surface facing the mounting substrate 2*a*, any surface other than the second principal surface 10*b* may be the mounting surface. The external electrodes 21A, 21B, 22A, 22B provided in the inductor array 1 at least partially contact the mounting surface of the base body 10. In the embodiment shown in FIG. 1, the external electrodes 21A, 21B, 22A, 22B are each partially in contact with the first and second principal surfaces 10A and 10B, so either the first principal surface 10*a* or the second principal surface 10*b* can be used as the mounting surface.

In the illustrated embodiment, the first and second principal surfaces 10*a* and 10*b* are parallel to the LW plane, the first and second end surfaces 10*c* and 10*d* are parallel to the WT plane, and the first and second side surfaces 10*e* and 10*f* are parallel to the TL plane.

The top-bottom direction of the inductor array 1 refers to the top-bottom direction in FIG. 1. The thickness direction of the inductor array 1 or the base body 10 may be the direction perpendicular to at least one of the top surface 10*a* or the mounting surface 10*b*. The length direction of the inductor array 1 or the base body 10 may be the direction perpendicular to at least one of the first end surface 10*c* or the second end surface 10*d*. The width direction of the inductor array 1 or the base body 10 may be the direction perpendicular to at least one of the first side surface 10*e* or the second side surface 10*f*. The width direction of the inductor array 1 or the base body 10 may be the direction perpendicular to the thickness and length directions of the inductor array 1 or the base body 10.

In the illustrated embodiment, the external electrode 22A is attached to the base body 10 at a position spaced apart from the external electrode 21A in the W-axis direction, and the external electrode 21B is attached to the base body 10 at a position spaced apart from the external electrode 21A in the L-axis direction. The external electrode 22B is attached to the base body 10 at a position spaced apart from the external electrode 22A in the L-axis direction and spaced apart from the external electrode 21B in the W-axis direction. In the illustrated embodiment, the external electrodes 21A and 21B are provided in contact with the mounting surface 10*b*, the first side surface 10*e*, and the top surface 10*a* of the base body 10, and the external electrodes 22A and 22B are provided in contact with the mounting surface 10*b*, the second side surface 10*f*, and the top surface 10*a* of the base body 10. The external electrodes 21A and 21B may be provided on the base body 10 such that they are in contact with the mounting surface 10*b* and the first side surface 10*e* but not with the top surface 10*a*. The external electrodes 22A and 22B may be provided on the base body 10 such that they are in contact with the mounting surface 10*b* and the second side surface 10*f* but not with the top surface 10*a*. The shape and arrangement of the external electrodes 21A, 22B, 22A, and 22B are not limited to those explicitly described herein. The external electrodes 21A, 21B, 22A, 22 may have either the same shape or different shapes. Any two of the external electrodes 21A, 21B, 22A, and 22B may be selected to have the same shape.

The base body 10 is made of a magnetic material. The magnetic material may be a ferrite material, a soft magnetic alloy material, a composite magnetic material including magnetic particles dispersed in a resin, or any other known magnetic materials. The ferrite material used for the base body 10 may be a Ni—Zn-based ferrite, a Ni—Zn—Cu-based ferrite, a Mn—Zn-based ferrite, or any other ferrite materials.

The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. The Fe-based metal magnetic particles contained in the base body 10 may contain 80 wt % or more Fe. An insulating film may be formed on the surface of each of the metal magnetic particles. The insulating film may be an oxide film made of an oxide of the above metals or alloys. The insulating film provided on the surface of each of the metal magnetic particles may be, for example, a silicon oxide film provided by the sol-gel coating process.

In one or more embodiments, the average particle size of the metal magnetic particles in the base body 10 is from 1.0 μm to 20 μm. The average particle size of the metal magnetic particles contained in the base body 10 may be smaller than 1.0 μm or larger than 20 μm. The base body 10 may contain two or more types of metal magnetic particles having different average particle sizes.

In the base body 10, the metal magnetic particles may be bonded to each other with an oxide film formed by oxidation of an element included in the metal magnetic particles during a manufacturing process. The base body 10 may contain a binder in addition to the metal magnetic particles. When the base body 10 contains a binder, the metal magnetic particles are bonded to each other by the binder. The binder in the base body 10 may be formed, for example, by curing a thermosetting resin that has an excellent insulation property. Examples of a material for such a binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

In one or more embodiments of the invention, the relative magnetic permeability of the base body 10 is 100 or less. In one or more embodiments of the invention, the relative magnetic permeability of the base body 10 is 30 or greater. When the inductor array 1 is used in a high frequency circuit, the relative magnetic permeability of the base body 10 may be lower. For example, when the inductor array 1 operates at a frequency of about 100 MHz, the lower limit of the relative magnetic permeability of the base body 10 may be 20 or greater. When the inductor array 1 operates at a higher frequency band, the lower limit of the relative magnetic permeability of the base body 10 may be 10 or greater. In one or more embodiments of the invention, the relative magnetic permeability of the base body 10 is in the range of 30 to 100 (both inclusive). The base body 10 may be configured to have a relative magnetic permeability in the range of 30 to 100 in its entire region. As described above, the inductor array 1 may be used in DC-to-DC converters where a low inductance is required. When the base body 10 has a relative magnetic permeability of 100 or less, it is easy to achieve a required low inductance. When the base body 10 has a relative magnetic permeability of 100 or less, it is also easy to achieve high current characteristics. When the base body 10 has a relative magnetic permeability of 100 or less, it is also easy to achieve high insulation properties. When the base body 10 has a relative magnetic permeability of 100 or less, it is possible to reduce the chance of magnetic saturation. Therefore, there is no need to provide a magnetic gap in the base body 10 to improve the DC superposition characteristics.

As mentioned above, the relative magnetic permeability of the base body 10 of the inductor array 1 takes a small value, such as 100 or smaller, so that the self-inductance L of each line of inductor included in the inductor array 1 also takes a small value. Since the self-inductance of each line of inductor is low, magnetic saturation is unlikely to occur in the inductor array 1. This allows a large current to flow through each line of inductor in the inductor array 1. Accordingly, in one or more embodiments of the present invention, each line of inductor in the inductor array 1 can achieve increased energy density Ed, which is expressed as the result of dividing the product of the self-inductance L of the inductor and the square of the current I flowing through the inductor by the volume V of the inductor ($Ed=L\times I^2/V$). For example, when the self-inductance L of each line of inductor in the inductor array 1 is less than 100 nH, the inductor can have Ed of 1500 $nH\cdot A^2/mm^3$. When the self-inductance L of each line of inductor in the inductor array 1 is less than 50 nH, the Ed can be 2000 $nH\cdot A^2/mm^3$. When the self-inductance L of each line of inductor in the inductor array 1 is less than 25 nH, the Ed can be 2500 $nH\cdot A^2/mm^3$.

In one or more embodiments of the invention, the internal conductors 25A, 25B have the same shape. In the illustrated embodiment, the internal conductors 25A, 25B have the same rectangular parallelepiped shape. Since the internal conductors 25A, 25B have the same shape, the inductor array 1 can easily achieve uniform electrical characteristics among the lines (i.e., the inductors 1A, 1B) formed therein. The internal conductors 25A, 25B, provided within the base body 10, may be placed at the same level in the T-axis direction. Specifically, as shown in FIG. 3, the internal conductors 25A, 25B are at the same level in the T-axis direction such that their respective top surfaces are at the same level in the T-axis direction and their respective bottom surfaces are at the same level in the T-axis direction. The internal conductors 25A, 25B may differ from each other in terms of shape due to the manufacturing- and/or measurement-induced errors, but this does not deny that the internal conductors 25A, 25B have the same shape as far as the present specification is concerned.

The internal conductors 25A, 25B may extend linearly from the first side surface 10*e* to the second side surface 10*f*. The internal conductors 25A, 25B can be shaped in any other manners than the illustrated such that they have winding portions, as will be described below. The other possible shapes of the internal conductors 25A, 25B will be described below.

The internal conductor 25A and the internal conductor 25B are provided within the base body 10. In the illustrated embodiment, the internal conductor 25A is exposed at one end thereof to the outside of the base body 10 from the first side surface 10*e* and is connected to the external electrode 21A at the one end. The internal conductor 25A is also exposed at the other end thereof to the outside of the base body 10 from the second side surface 10*f* and is connected to the external electrode 22A at the other end. In this manner, the internal conductor 25A is connected at one end thereof to the external electrode 21A and connected at the other end thereof to the external electrode 22A. Similarly, the internal conductor 25B is exposed at one end thereof to the outside of the base body 10 from the first side surface 10*e* and is connected to the external electrode 21B at the one end. The internal conductor 25B is also exposed at the other end thereof to the outside of the base body 10 from the second side surface 10*f* and is connected to the external electrode 22B at the other end. In this manner, the internal conductor 25B is connected at one end thereof to the external electrode 21B and connected at the other end thereof to the external electrode 22B. In this way, to connect the internal conductors 25A and 25B to the external electrodes, the internal conductors 25A and 25B are not directly connected to a first surface, but are connected to the first surface outside the base body 10 via the external electrodes 21A, 22A, 21B and 22B formed on the first and second side surfaces. Therefore, the volume of the base body 10 can be increased relative to the overall volume of the inductor array 1. Consequently, the proportion in volume of the base body 10, which is made of a magnetic material, can be larger in the inductor array 1. This can result in higher saturation magnetic flux density of the base body 10.

The internal conductor 25A extends linearly from the external electrode 21A to the second external electrode 22A in plan view (as viewed from the T axis). Stated differently, the internal conductor 25A has no parts facing each other in the base body 10 in plan view. Herein, when the internal conductor 25A has no parts facing each other in the base body in plan view, it can be said that the internal conductor 25A extends linearly from the external electrode 21A to the external electrode 22A. Thus, compared with conventional inductors that have internal conductors with parts facing each other in plan view, the insulation reliability (withstand voltage) can be increased without changing the volume resistivity of the base body 10. The internal conductor 25A may be disposed on a straight line drawn from the external electrode 21 to the external electrode 22. In the illustrated embodiment, the internal conductor 25A has a rectangular parallelepiped shape. The internal conductor 25A may include multiple conductor layers arranged in parallel between the external electrode 21A and the external electrode 22A. All of the plurality of conductor portions extend linearly from the external electrode 21 to the external electrode 22 and are shaped similarly to each other. Each of the conductor layers included in the internal conductor 25A has no parts that are disposed to face each other in the base body 10. Since the plurality of conductor layers are shaped similarly to each other, among the plurality of conductor layers, there is no difference in potential between such parts that face each other in the base body 10. Therefore, even when the internal conductor 25A is formed of the plurality of conductor layers as described above, the insulation reliability (withstand voltage) required of the base body 10 can be about the same as when the internal conductor 25A is formed of a single conductor layer. The plurality of conductor layers included in the internal conductor 25A may be connected to each other in the base body 10. The internal conductor 25A and the internal conductor 25B may each be formed of a plurality of conductors that are connected to each other by means other than through-holes. The internal conductor 25A and the internal conductor 25B may each include a plurality of conductors that are not connected to each other in the base body 10, but are connected by the external electrodes 21A and 22A and the external electrodes 21B and 22B.

FIGS. 1 and 3 show a reference axis Ax1 extending along the L-axis, which is an imaginary axis extending through the first and second end surfaces 10*c* and 10*d*. In the embodiment shown, the reference axis Ax1 extends in the direction parallel to the L-axis. The reference axis Ax1 may extend through the geometric center of gravity of the first end surface 10*c* and the geometric center of gravity of the second end surface 10*d*. When the first end surface 10*c* has a rectangular shape, the geometric center of gravity of the first end surface 10*c* lies at the point of intersection of the diagonal lines of the rectangle defining the first end surface 10*c*. The internal conductors 25A, 25B are arranged along the reference axis Ax1. In the direction perpendicular to the reference axis Ax1, the internal conductors 25A, 25B extend from the first side surface 10*e* to the second side surface 10*f*.

As shown in FIG. 2, the inductor array 1 may have a laminated structure having a plurality of magnetic layers stacked on each other. In FIG. 2, the external electrodes 21A, 22A, 21B, and 22B are not shown for convenience of description. In the illustrated embodiment, the base body 10 includes magnetic layers 11*a* to lie. Each of the magnetic layers 11*a* to lie is made of a magnetic material. The base body 10 includes the magnetic layer 11*a*, the magnetic layer 11*b*, the magnetic layer 11*c*, the magnetic layer 11*d*, and the magnetic layer 11*e*, which are stacked together in the stated order from the negative side to the positive side in the L-axis direction. As shown, the magnetic layers 11*a*, 11*c* and lie may each include a plurality of magnetic layers. Likewise, the magnetic layers other than the magnetic layers 11*a*, 11*c* and lie may each include a plurality of magnetic layers. The magnetic layer 11*a* and the magnetic layer lie are disposed so as to cover the internal conductors 25A and 25B on both sides in the L-axis direction, and thus these magnetic layers may be referred to as the cover layers.

The internal conductor 25A is provided on one surface of the magnetic layer 11*b*, and the internal conductor 25B is provided on one surface of the magnetic layer 11*d*. More specifically, the internal conductor 25A is provided on one of the surfaces of the magnetic layer 11*b* intersecting the L axis, or the positive-side surface in the L-axis direction, and the internal conductor 25B is provided on one of the surfaces of the magnetic layer 11*d* intersecting the L axis, or the positive-side surface in the L-axis direction. The internal conductors 25A and 25B are formed by, for example, printing a conductive paste made of a highly conductive metal or alloy on each magnetic layer by screen printing. The conductive material contained in the conductive paste may be Ag, Cu, or alloys thereof. In the embodiment shown, the internal conductor 24A is provided on the magnetic layer 11*b* and the internal conductor 25B is provided on the magnetic layer 11*d*, which is a different magnetic layer from the magnetic layer 11*b*. The internal conductors 25A and 25B may be, however, provided on the same magnetic layer. The internal conductors 25A and 25B can be made of other materials and using other techniques. For example, the internal conductors 25A and 25B may be formed by sputtering, ink-jetting, or other known methods. The internal conductors 25A and 25B may be formed by embedding metal foil or alloy foil in any of the magnetic layers 11*a* to 11*e* or by embedding or sandwiching such foil between adjacent ones of the magnetic layers 11*a* to 11*e*.

With further reference to FIG. 3, the arrangement and sectional shape of the internal conductors 25A and 25B will be further described. FIG. 3 is a sectional view schematically showing the section of the inductor array 1 along the I-I line. More specifically, FIG. 3 shows the section of the inductor array 1 cut along a plane extending through the reference axis Ax1 and perpendicular to the bottom surface 10*b* (parallel to the LT plane). The plane extending through the reference axis Ax1 and perpendicular to the bottom surface 10*b* may be herein referred to as "the reference plane." For brevity of explanation, FIG. 3 does not show the external electrodes 21A, 21B, 22A, 22B.

In one or more embodiments of the present invention, the internal conductor 25B is spaced apart from the internal conductor 25A in the direction of the reference axis Ax1. The base body 10 includes an inter-conductor region 10A. The inter-conductor region 10A is positioned between the internal conductor 25A and the internal conductor 25B. The inter-conductor region 10A refers to the region of the base body 10 positioned between the internal conductor 25A and the internal conductor 25B and overlapping with both the internal conductor 25A and the internal conductor 25B as viewed from the reference axis direction along the reference axis Ax1 (i.e., as viewed from the L-axis direction). In the case where the inductor array 1 includes three or more internal conductors, the inter-conductor region may refer to the regions positioned between adjacent ones of the three or more internal conductors and overlapping with both the adjacent ones of the internal conductors as viewed from the reference axis direction along the reference axis Ax1. In the case where the inductor array 1 includes N internal conductors, the inductor array 1 can include N−1 inter-conductor regions.

The inter-conductor region 10A extends over the entire distance between the internal conductor 25A and the internal conductor 25B in the reference axis direction. In other words, the inter-conductor region 10A is in contact with the internal conductor 25A at one end thereof in the reference axis direction and is in contact with the internal conductor 25B at the other end thereof in the reference axis direction.

As shown in FIG. 3, the section of the inter-conductor region 10A cut along the plane extending through the reference axis Ax1 and perpendicular to the bottom surface 10*b* (i.e., the reference plane) has a rectangular shape. For convenience of description, the section of the inter-conductor region 10A cut along the reference plane may be referred to simply as "the section of the inter-conductor region 10A." As shown, the dimension of the section of the inter-conductor region 10A in the reference axis direction along the reference axis Ax1 (L-axis direction) is referred to as the first reference axis direction dimension a1, and the dimension of the section of the inter-conductor region 10A in the orthogonal direction orthogonal to the reference axis Ax1 (T-axis direction) is referred to as the first orthogonal direction dimension a2.

The internal conductor 25A is spaced apart from the top surface 10*a*, the bottom surface 10*b*, and the second end surface 10*d* of the base body 10 by the distances a3A, a4A, and a5A, respectively. The internal conductor 25B is spaced apart from the top surface 10*a*, the bottom surface 10*b*, and the first end surface 10*c* of the base body 10 by the distances a3B, a4B, and a5B, respectively. In the embodiment shown, as described above, the internal conductors 25A, 25B are at the same level in the T-axis direction, and therefore, the distance a3A is equal to the distance a3B, and the distance a4A is equal to the distance a4B.

In one or more embodiments of the present invention, the internal conductor 25A is positioned in the base body 10 such that the distances a3A, a4A, and a5A are equal to one another. If any one of the distances a3A, a4A, and a5A is smaller than the others, an increased magnetic resistance occurs at a part of the periphery of the internal conductor 25A, resulting in a degraded self-inductance of the inductor 1A. For example, if the distance a3A is smaller than the distances a4A and a5A, the magnetic resistance in the region between the internal conductor 25A and the top surface 10*a* of the base body 10 is larger than that in the other regions within the base body 10, and thus the self-inductance of the inductor 1A is degraded. When the distances a3A, a4A, and a5A are equal to one another, the magnetic base body 10 can have an even thickness in the periphery of the internal conductor 25A, preventing degradation of the self-inductance of the inductor 1A. Likewise, the internal conductor 25B is positioned in the base body 10 such that the distances a3B, a4B, and a5B are equal to one another. This can prevent degradation of the self-inductance of the inductor 1B.

In one or more embodiments of the invention, the first aspect ratio, which is the ratio of the first orthogonal direction dimension a2 to the first reference axis direction dimension a1 (a2/a1), is less than 1. Since the first aspect ratio of the inter-conductor region 10A is less than 1, the magnetic resistance of the inter-conductor region 10A can be small. Thus, the magnetic flux generated when the electric current flowing through the internal conductor 25A varies is likely to pass through the inter-conductor region 10A and is conversely unlikely to reach the internal conductor 25B, and therefore, the magnetic coupling between the inductor 1A and the inductor 1B can be reduced. Further, since the first aspect ratio of the inter-conductor region 10A is less than 1, the distance between the internal conductor 25A and the internal conductor 25B can be large, and therefore, the length of the magnetic path encircling both the internal conductor 25A and the internal conductor 25B can be large. Thus, the magnetic flux generated when the electric current flowing through the internal conductor 25A varies is unlikely to reach the internal conductor 25B, and therefore, the magnetic coupling between the inductor 1A and the inductor 1B can be reduced.

In the inductor array 1, the pitch between the internal conductors is represented by the first reference axis direction dimension a1 of the inter-conductor region 10A. In one or more embodiments of the present invention, the internal conductors 25A, 25B are positioned such that the first reference axis direction dimension a1 of the inter-conductor region 10A is less than double the shortest distance between the internal conductor 25A and the surface of the base body 10 in the reference plane extending through the reference axis Ax1 and perpendicular to the bottom surface 10*b* of the base body 10. In the embodiment shown, the smallest of the distances a3A, a4A, and a5A is the shortest distance between the internal conductor 25A and the surface of the base body 10 in the reference plane. When the distances a3A, a4A, and a5A are equal to one another, the internal conductors 25A, 25B are positioned such that the first reference axis direction dimension a1 of the inter-conductor region 10A is less than, for example, double the distance a3A between the internal conductor 25A and the top surface 10*a* of the base body 10. Thus, the inductor array 1 can have a small dimension in the reference axis direction and thus have a small mounting area. In conventional inductor arrays, the magnetic base body has an even thickness in the periphery of each internal conductor so as to efficiently improve the self-inductance of each inductor. Since the magnetic base body has an even thickness in the periphery of each internal conductor, the interval between adjacent internal conductors (i.e., the dimension of the inter-conductor region between the adjacent internal conductors in the reference axis direction) is double the shortest distance between the internal conductor and the surface of the base body (for example, the distance between the internal conductor and the top surface of the base body) in the reference plane. Further, in conventional inductor arrays, the interval between adjacent internal conductors is larger than double the shortest distance between the internal conductor and the surface of the base body so as to reduce magnetic coupling. By contrast, in the inductor array 1, the first aspect ratio of the inter-conductor region 10A is less than 1, so as to reduce magnetic coupling between the inductor 1A and the inductor 1B, and therefore, the pitch between the internal conductor 25A and the internal conductor 25B (i.e., the first reference axis direction dimension a1 of the inter-conductor region 10A) can be less than double the shortest distance between the internal conductor and the surface of the base body (for example, the distance a3A between the internal conductor and the top surface) in the reference plane.

In one or more embodiments of the present invention, the internal conductors 25A, 25B are positioned such that the first reference axis direction dimension a1 of the inter-conductor region 10A is equal to or larger than the distance a3A between the internal conductor 25A and the top surface 10*a* of the base body 10. Thus, the magnetic resistance in the inter-conductor region 10A is higher than that in the other regions, and this prevents degradation of the self-inductance of the inductors 1A, 1B.

In the case where an inductor array includes three or more internal conductors, the magnetic base body 10 of this inductor array can include two or more inter-conductor regions. The above description of the inter-conductor region 10A may apply to each of the two or more inter-conductor regions included in the inductor array 1.

The following now describes the shape of the internal conductors included in the inductor array with reference mainly to FIG. 4. FIG. 4 is an enlarged sectional view showing, on an enlarged scale, the sections of the internal conductors 25A, 25B shown in FIG. 3. As shown, the section of the internal conductor 25A has a dimension b1A in the reference axis direction and a dimension b2A in the direction perpendicular to the reference axis direction, and the section of the internal conductor 25B has a dimension b1B in the reference axis direction and a dimension b2B in the direction perpendicular to the reference axis direction. As described above, the internal conductors 25A, 25B have the same shape, and therefore, the dimension b1A is equal to the dimension b1B, and the dimension b2A is equal to the dimension b2B. In this specification, when the dimension b1A and the dimension b1B do not need to be distinguished from each other, the dimension b1A and the dimension b1B are collectively referred to as the dimension b1, and the dimension b2A and the dimension b2B are collectively referred to as the dimension b2.

The ratio of the dimension b2 to the dimension b1 (b2/b1) is referred to as a second aspect ratio. In one or more embodiments of the invention, the second aspect ratio (b2/b1) is equal to or larger than the first aspect ratio (a2/a1). For example, the second aspect ratio may be in the range of 0.5 to 1.5. When the shape of the internal conductors 25A, 25B is set such that the second aspect ratio approximates 1 (for example, in the range of 0.5 to 1.5), the inductors 1A, 1B can have a high self-inductance.

An inductor array according to another embodiment, to which the present invention is applicable, will be now described with reference to FIGS. 5 to 11.

Figure 5:
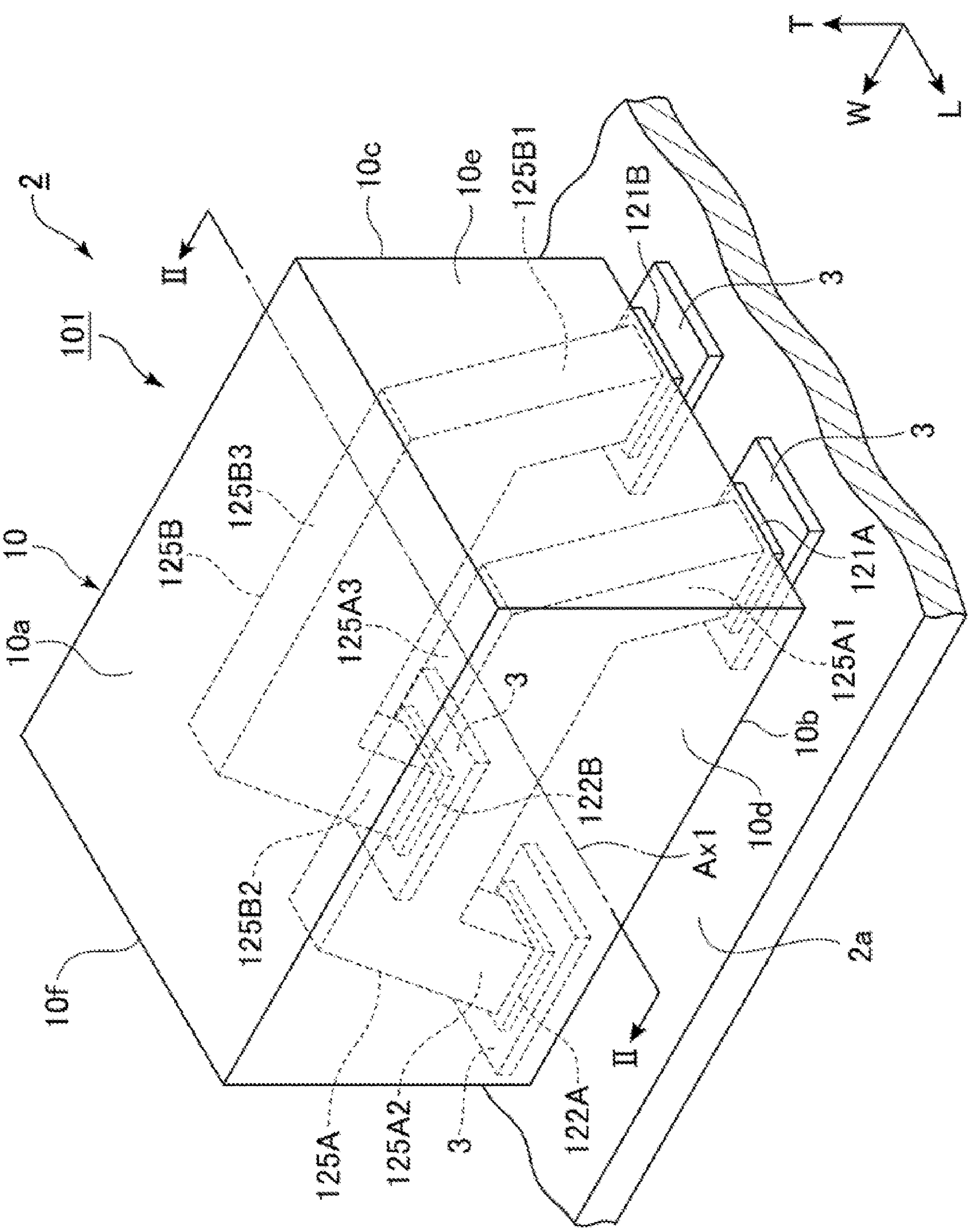
FIG. 5 is a perspective view of the inductor array according to another embodiment of the invention.
Figure 6:
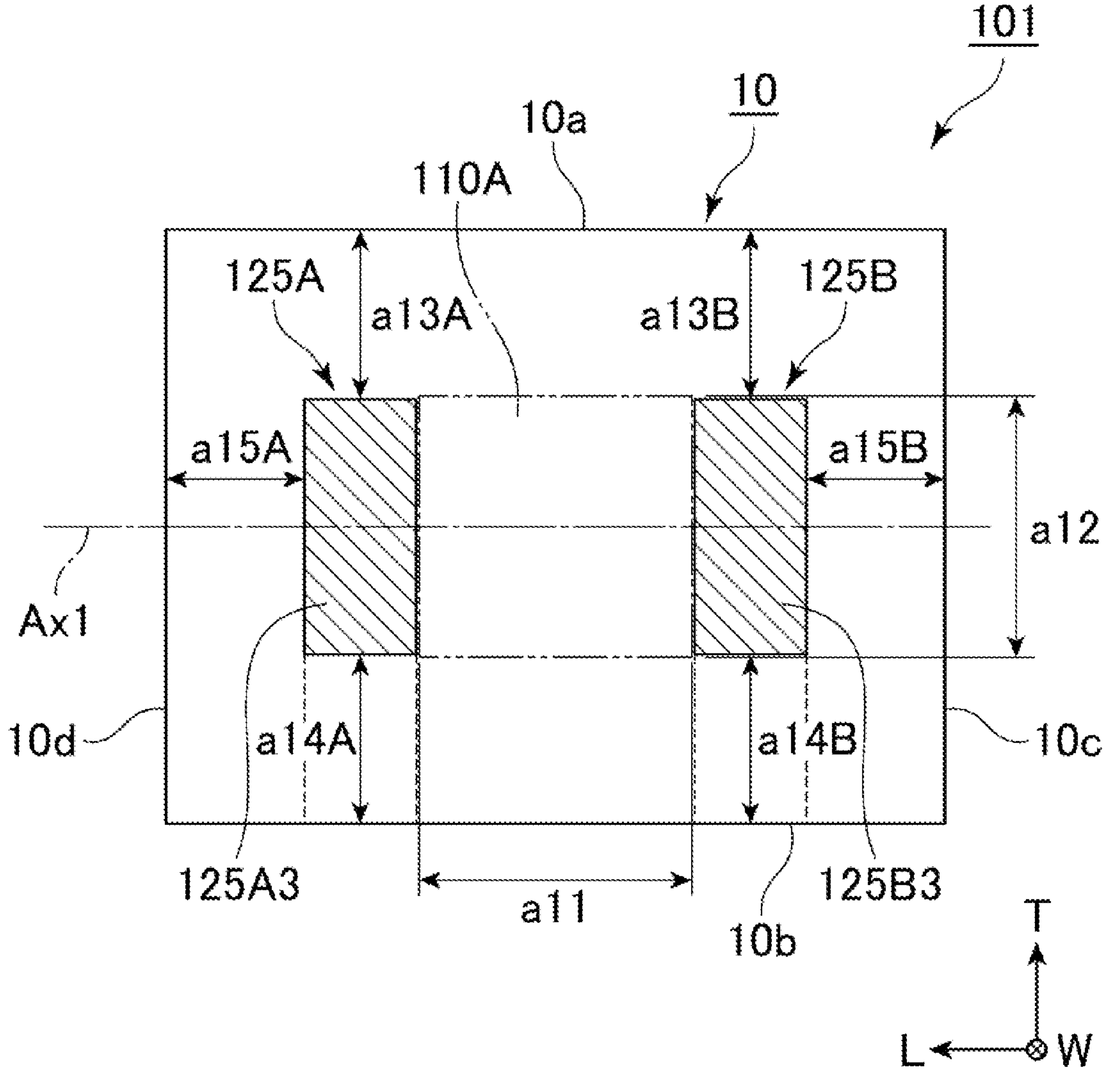
FIG. 6 is a sectional view schematically showing a section of the inductor array of FIG. 5 cut along the plane extending through a reference axis and perpendicular to the bottom surface of the magnetic base body.

First, an inductor array 101 according to one or more embodiments of the present invention will be described with reference to FIGS. 5 and 6. FIG. 5 is a perspective view of the inductor array 101, and FIG. 6 is a sectional view schematically showing a section of the inductor array 101 cut along the plane extending through the reference axis Ax1 and perpendicular to the bottom surface 10*b* of the base body 10 (i.e., the reference plane). The inductor array 101 shown in FIGS. 5 to 6 differs from the inductor array 1 in that it has internal conductors 125A and 125B instead of the internal conductors 25A and 25B, respectively, and external electrodes 121A, 122A, 121B, and 122B instead of the external electrodes 21A, 22A, 21B, and 22B, respectively. The following description does not mention the common features shared between the inductor arrays 101 and 1.

In the illustrated embodiment, the external electrodes 121A, 122A, 121B, 122B are all provided on the second principal surface 10*b* of the base body 10. The shapes of the external electrodes 121A, 122A, 121B, 122B are not limited to those shown. For example, the external electrodes 121A and 121B may be provided on the base body 10 such that they are in contact with the second principal surface 10*b* and the first side surface 10*e*. The external electrodes 122A and 122B may be provided on the base body 10 such that they are in contact with the second principal surface 10*b* and the second side surface 10*f*.

In the embodiment illustrated, the internal conductor 125A is provided in the base body 10 so as to electrically connect between the external electrode 121A and the external electrode 122A. The internal conductor 125A includes a first portion 125A1, a second portion 125A2, and a third portion 125A3. The first portion 125A1 is connected to the external electrode 121A at one end and extends in an angled direction with respect to the T axis, and the second portion 125A2 is connected to the external electrode 122A at one end and extends in an angled direction with respect to the T axis. The third portion 125A3 extends in the W-axis direction and connects the other end of the first portion 125A1 with the other end of the second portion 125A2.

In the embodiment illustrated, the internal conductor 125B is provided in the base body 10 so as to electrically connect between the external electrode 121B and the external electrode 122B, and has the same shape as the internal conductor 125A. More specifically, the internal conductor 125B includes a first portion 125B1, a second portion 125B2, and a third portion 125B3. The first portion 121B1 is connected to the external electrode 121B at one end and extends in an angled direction with respect to the T axis, and the second portion 125B2 is connected to the external electrode 122B at one end and extends in an angled direction with respect to the T axis. The third portion 125B3 extends in the W-axis direction and connects the other end of the first portion 121B1 with the other end of the second portion 121B2.

The internal conductor 125A extends linearly from the external electrode 121A to the second external electrode 122A in plan view (as viewed from the T axis). The internal conductor 125B may extend linearly from the external electrode 121B to the second external electrode 122B in plan view (as viewed from the T axis). In this way, the internal conductors 125A and 125B have no parts facing each other in the base body 10 in plan view. Since the internal conductors 125A and 125B have no parts facing each other in the base body 10 in plan view, the insulation reliability (withstand voltage) can be increased without changing the volume resistivity of the base body 10, compared with conventional inductors that have internal conductors with parts facing each other in plan view.

The base body 10 includes an inter-conductor region 110A. The inter-conductor region 110A refers to the region of the base body 10 positioned between the internal conductor 125A and the internal conductor 125B and overlapping with both the internal conductor 125A and the internal conductor 125B as viewed from the reference axis direction along the reference axis Ax1 (i.e., as viewed from the L-axis direction). The dimension of the section of the inter-conductor region 110A in the reference axis direction along the reference axis Ax1 (L-axis direction) is referred to as the first reference axis direction dimension a11, and the dimension of the section of the inter-conductor region 110A in the orthogonal direction orthogonal to the reference axis Ax1 (T-axis direction) is referred to as the first orthogonal direction dimension a12. The section of the inter-conductor region 110A refers to the section of the inter-conductor region 110A cut along the plane extending through the reference axis Ax1 and perpendicular to the bottom surface 10*b*.

The third portion 125A3 of the internal conductor 125A is spaced apart from the top surface 10*a*, the bottom surface 10*b*, and the second end surface 10*d* of the base body 10 by the distances a13A, a14A, and a15A, respectively. The distances a13A, a14A, and a15A may be equal to one another. The third portion 125B3 of the internal conductor 125B is spaced apart from the top surface 10*a*, the bottom surface 10*b*, and the first end surface 10*c* of the base body 10 by the distances a13B, a14B, and a15B, respectively. The distances a13B, a14B, and a15B may be equal to one another.

In the inductor array 101, the first aspect ratio of the inter-conductor region 110A is defined as the ratio of the first orthogonal direction dimension a12 to the first reference axis direction dimension a11 (a12/a11). In one or more embodiments of the invention, the first aspect ratio of the inter-conductor region 110A (a12/a11) is less than 1. Thus, the magnetic flux generated when the electric current flowing through the internal conductor 125A varies is unlikely to reach the internal conductor 125B, and therefore, the magnetic coupling between the inductors included in the inductor array 101 can be reduced.

In one or more embodiments of the present invention, the first reference axis direction dimension a11 of the inter-conductor region 110A is less than double the shortest distance between the internal conductor 25A and the surface of the base body 10 in the reference plane. Thus, the inductor array 101 can have a small dimension in the reference axis direction and thus have a small mounting area.

The second aspect ratio of the internal conductor 125A can be defined as the ratio of the dimension of the section of the third portion 125A3 of the internal conductor 125A in the direction perpendicular to the reference axis direction to the dimension of the same section in the reference axis direction. Likewise, the second aspect ratio of the internal conductor 125B can be defined as the ratio of the dimension of the section of the third portion 125B3 of the internal conductor 125B in the direction perpendicular to the reference axis direction to the dimension of the same section in the reference axis direction. In one or more embodiments of the invention, both the second aspect ratio of the internal conductor 125A and the second aspect ratio of the internal conductor 125B are equal to or larger than the first aspect ratio of the inter-conductor region 110A of the inductor array 101.

Figure 7:
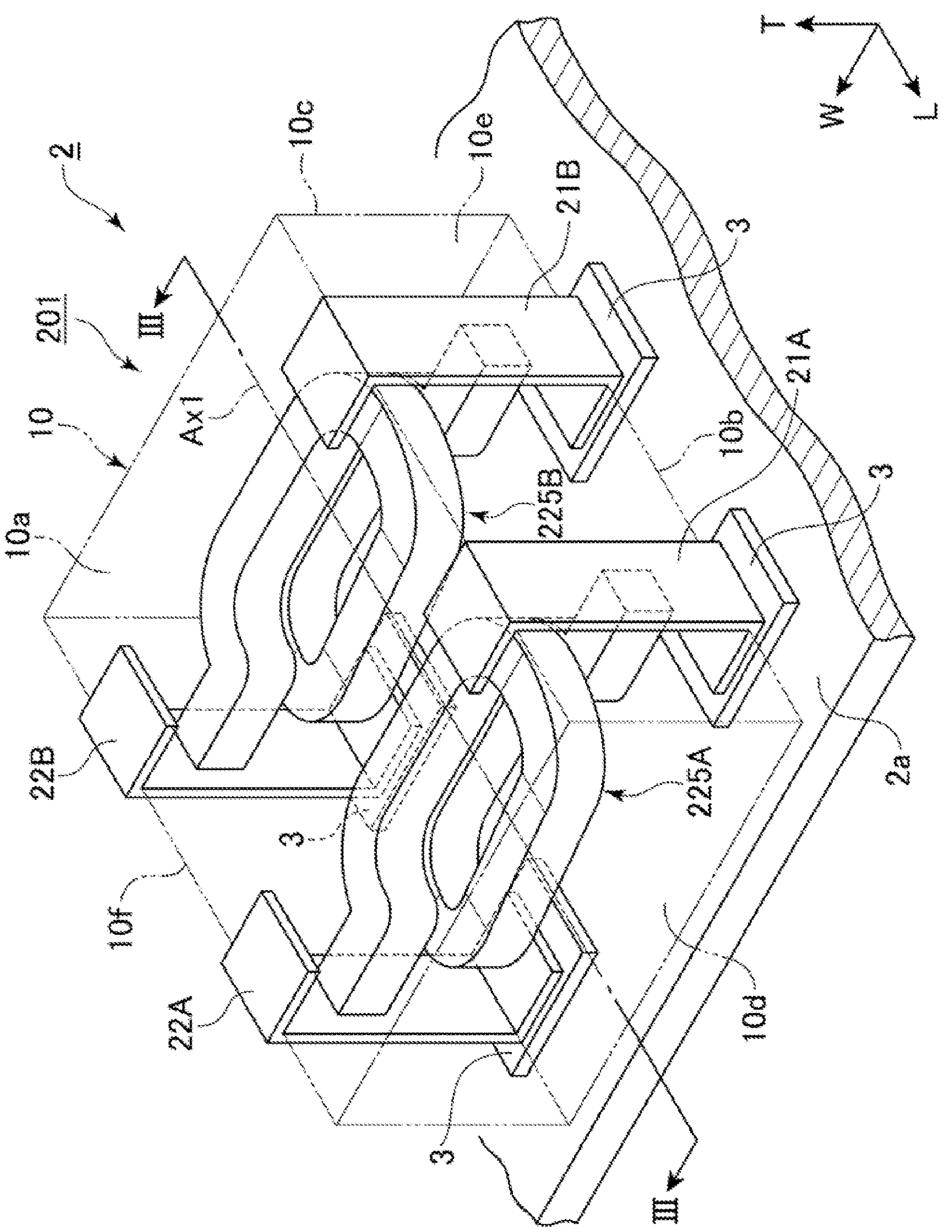
FIG. 7 is a perspective view of an inductor array according to another embodiment of the present invention.
Figure 8:
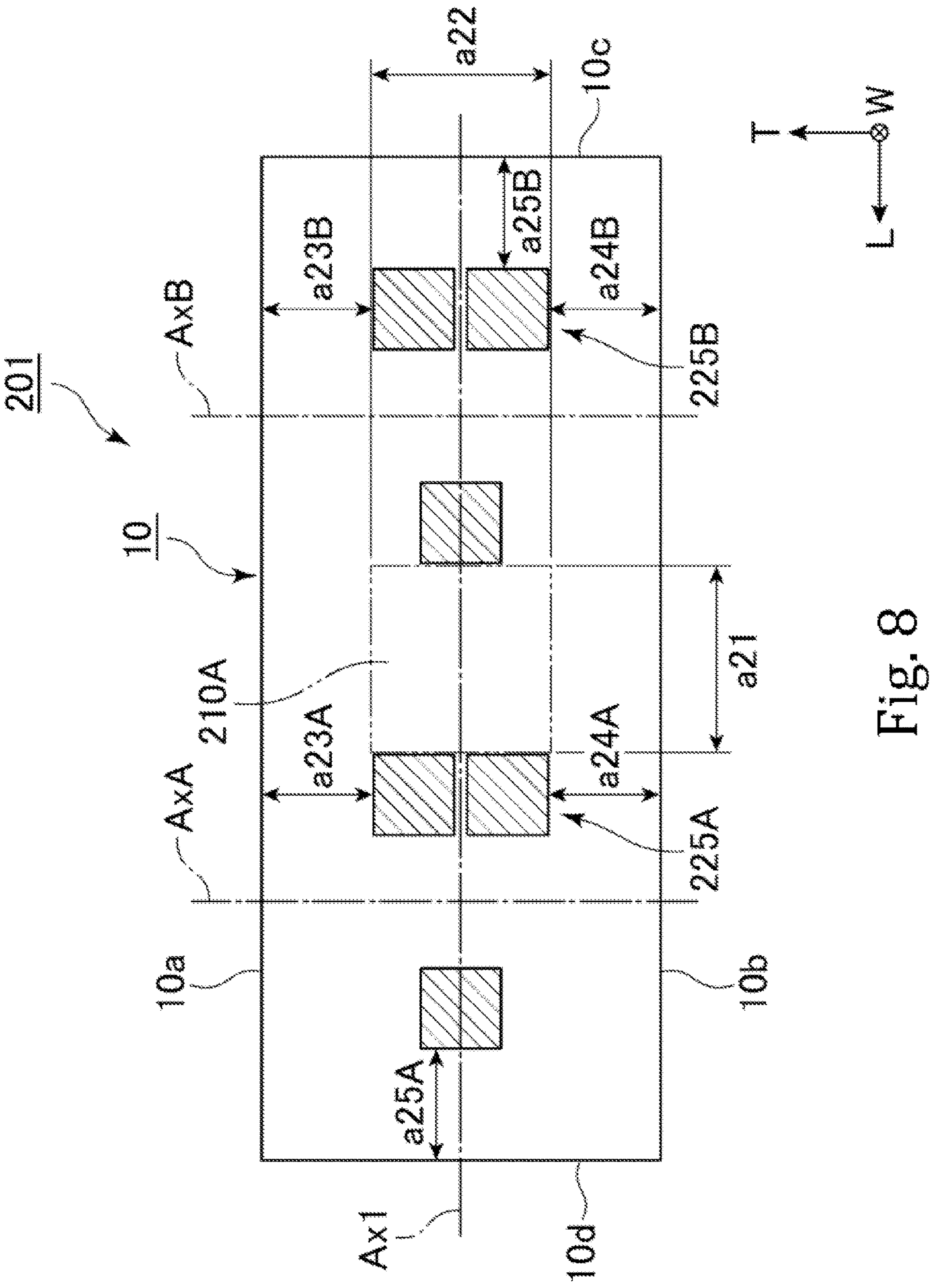
FIG. 8 is a sectional view schematically showing a section of the inductor array of FIG. 7 cut along the plane extending through a reference axis and perpendicular to the bottom surface of the magnetic base body.

Next, an inductor array 201 according to one or more embodiments of the present invention will be described with reference to FIGS. 7 and 8. FIG. 7 is a perspective view of the inductor array 201, and FIG. 8 is a sectional view schematically showing a section of the inductor array 201 cut along the plane perpendicular to the bottom surface 10*b* of the base body 10 (i.e., the reference plane). The inductor array 201 is different from the inductor array 1 in that it includes internal conductors 225A and 225B instead of the internal conductors 25A and 25B, respectively. The following description does not mention the common features shared between the inductor arrays 201 and 1.

The internal conductor 225A is wound spirally around a coil axis AxA extending along the T-axis direction, and the internal conductor 225B is wound spirally around a coil axis AxB extending along the T-axis direction.

The base body 10 includes an inter-conductor region 210A. The inter-conductor region 210A refers to the region of the base body 10 positioned between the internal conductor 225A and the internal conductor 225B and overlapping with both the internal conductor 225A and the internal conductor 225B as viewed from the reference axis direction along the reference axis Ax1 (i.e., as viewed from the L-axis direction). The dimension of the section of the inter-conductor region 210A in the reference axis direction along the reference axis Ax1 (L-axis direction) is referred to as the first reference axis direction dimension a21, and the dimension of the section of the inter-conductor region 210A in the orthogonal direction orthogonal to the reference axis Ax1 (T-axis direction) is referred to as the first orthogonal direction dimension a22. The section of the inter-conductor region 210A refers to the section of the inter-conductor region 210A cut along the plane extending through the reference axis Ax1 and perpendicular to the bottom surface 10*b*.

The internal conductor 225A is spaced apart from the top surface 10*a*, the bottom surface 10*b*, and the second end surface 10*d* of the base body 10 by the distances a23A, a24A, and a25A, respectively. The distances a23A, a24A, and a25A may be equal to one another. The internal conductor 225B is spaced apart from the top surface 10*a*, the bottom surface 10*b*, and the first end surface 10*c* of the base body 10 by the distances a23B, a24B, and a25B, respectively. The distances a23B, a24B, and a25B may be equal to one another.

In the inductor array 201, the first aspect ratio of the inter-conductor region 210A is defined as the ratio of the first orthogonal direction dimension a22 to the first reference axis direction dimension a21 (a22/a21). In one or more embodiments of the invention, the first aspect ratio of the inter-conductor region 210A (a22/a21) is less than 1. Thus, the magnetic flux generated when the electric current flowing through the internal conductor 225A varies is unlikely to reach the internal conductor 225B, and therefore, the magnetic coupling between the inductors included in the inductor array 201 can be reduced.

In one or more embodiments of the present invention, the first reference axis direction dimension a21 of the inter-conductor region 210A is less than double the shortest distance between the internal conductor 225A and the surface of the base body 10 in the reference plane. Thus, the inductor array 201 can have a small dimension in the reference axis direction and thus have a small mounting area.

Figure 9:
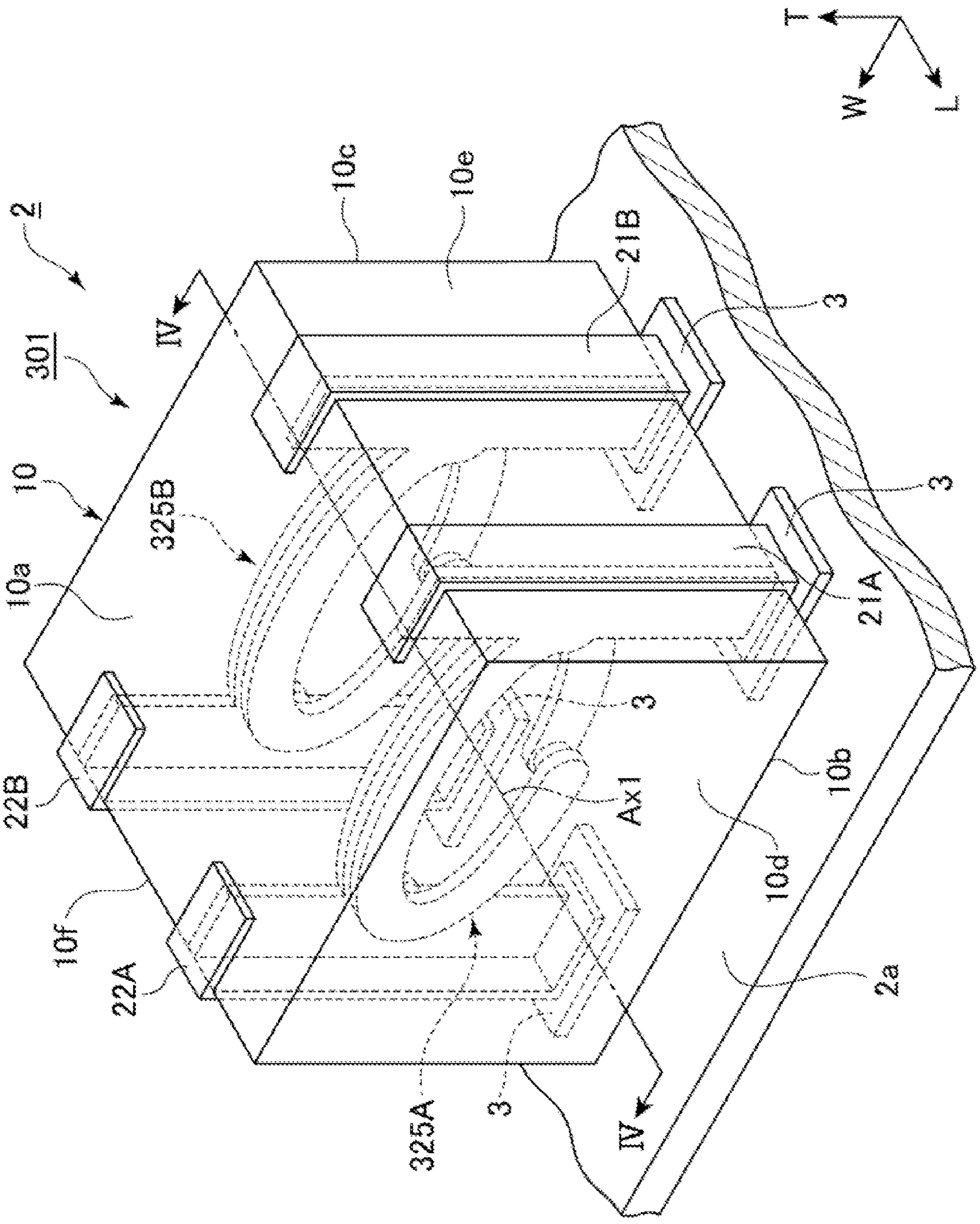
FIG. 9 is a perspective view of the inductor array according to another embodiment of the invention.
Figure 10:
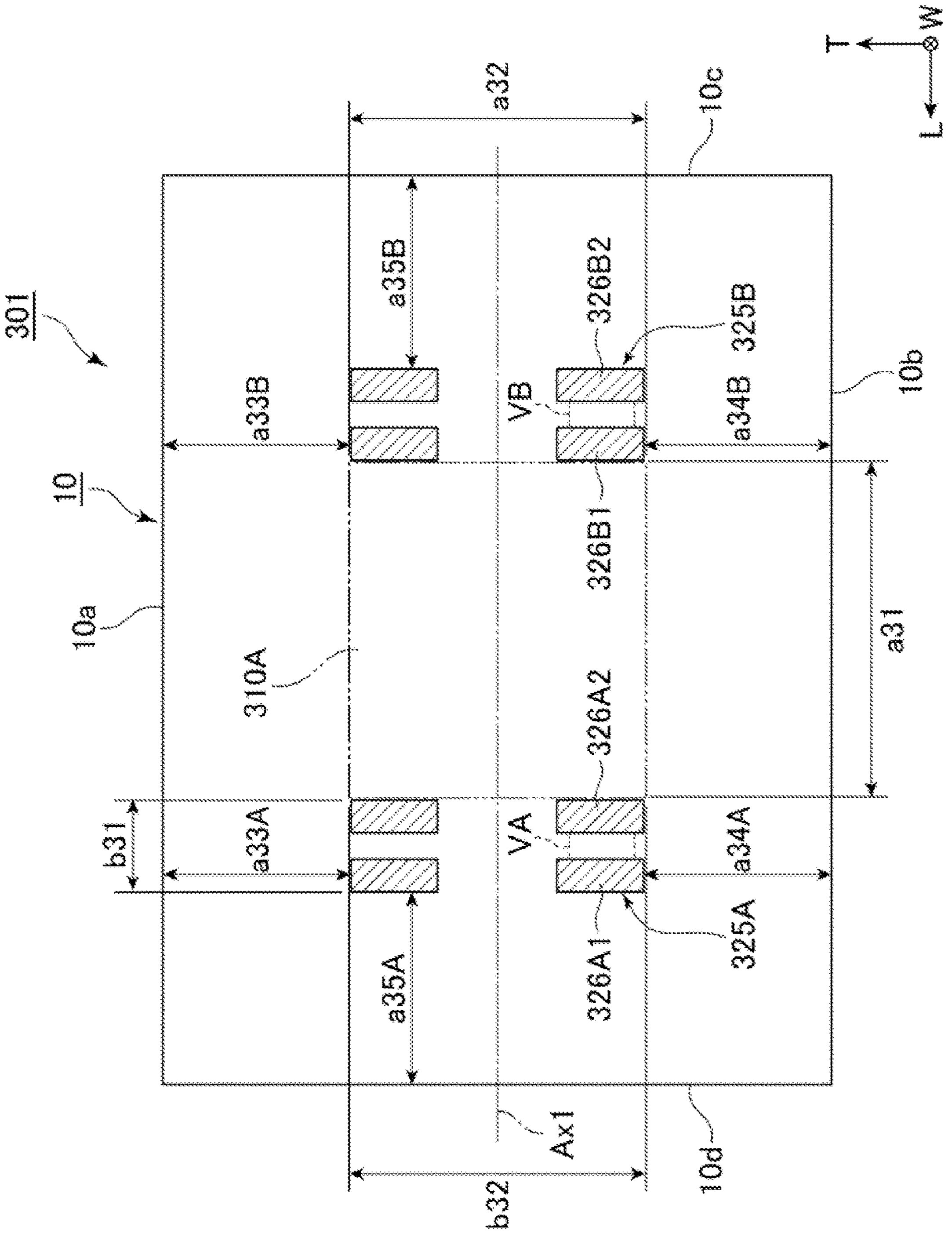
FIG. 10 is a sectional view schematically showing a section of the inductor array of FIG. 9 cut along the plane extending through a reference axis and perpendicular to the bottom surface of the magnetic base body.

Next, an inductor array 301 according to one or more embodiments of the present invention will be described with reference to FIGS. 9 and 10. FIG. 9 is a perspective view of the inductor array 301, and FIG. 10 is a sectional view schematically showing a section of the inductor array 301 cut along the plane perpendicular to the bottom surface 10*b* of the base body 10 (i.e., the reference plane). The inductor array 301 is different from the inductor array 1 in that it includes internal conductors 325A and 325B instead of the internal conductors 25A and 25B, respectively. The following description does not mention the common features shared between the inductor arrays 301 and 1.

In the embodiment shown, the internal conductor 325A includes winding patterns 326A1, 326A2 extending in the circumferential direction around the reference axis Ax1. The winding patterns 326A1 and 326A2 are connected together through the via VA. The internal conductor 325B includes winding patterns 326B1, 326B2 extending in the circumferential direction around the reference axis Ax1. The winding patterns 326B1 and 326B2 are connected together through the via VB.

The base body 10 includes an inter-conductor region 310A. The inter-conductor region 310A refers to the region of the base body 10 positioned between the internal conductor 325A and the internal conductor 325B and overlapping with both the internal conductor 325A and the internal conductor 325B as viewed from the reference axis direction along the reference axis Ax1 (i.e., as viewed from the L-axis direction). The dimension of the section of the inter-conductor region 310A in the reference axis direction along the reference axis Ax1 (L-axis direction) is referred to as the first reference axis direction dimension a31, and the dimension of the section of the inter-conductor region 310A in the orthogonal direction orthogonal to the reference axis Ax1 (T-axis direction) is referred to as the first orthogonal direction dimension a32. The section of the inter-conductor region 310A refers to the section of the inter-conductor region 310A cut along the plane extending through the reference axis Ax1 and perpendicular to the bottom surface 10*b*.

The internal conductor 325A is spaced apart from the top surface 10*a*, the bottom surface 10*b*, and the second end surface 10*d* of the base body 10 by the distances a33A, a34A, and a35A, respectively. The distances a33A, a34A, and a35A may be equal to one another. The internal conductor 325B is spaced apart from the top surface 10*a*, the bottom surface 10*b*, and the first end surface 10*c* of the base body 10 by the distances a33B, a34B, and a35B, respectively. The distances a33B, a34B, and a35B may be equal to one another.

In the inductor array 301, the first aspect ratio of the inter-conductor region 310A is defined as the ratio of the first orthogonal direction dimension a32 to the first reference axis direction dimension a31 (a32/a31). In one or more embodiments of the invention, the first aspect ratio of the inductor array 301 (a32/a31) is less than 1. Thus, the magnetic flux generated when the electric current flowing through the internal conductor 325A varies is unlikely to reach the internal conductor 325B, and therefore, the magnetic coupling between the inductors included in the inductor array 301 can be reduced.

In one or more embodiments of the present invention, the first reference axis direction dimension a31 of the inter-conductor region 310A is less than double the shortest distance between the internal conductor 325A and the surface of the base body 10 in the reference plane. Thus, the inductor array 301 can have a small dimension in the reference axis direction and thus have a small mounting area.

The second aspect ratio of the internal conductor 325A can be defined as the ratio of the dimension b32 of the section of the internal conductor 325A in the direction perpendicular to the reference axis direction to the dimension b31 of the same section in the reference axis direction. In one or more embodiments of the invention, the second aspect ratio of the internal conductor 325A is equal to or larger than the first aspect ratio of the inter-conductor region 310A. Likewise, the second aspect ratio of the internal conductor 325B can be defined as the ratio of the dimension of the section of the internal conductor 325B in the direction perpendicular to the reference axis direction to the dimension of the same section in the reference axis direction. The second aspect ratio of the internal conductor 325B is also equal to or larger than the first aspect ratio of the inter-conductor region 310A.

Figure 11:
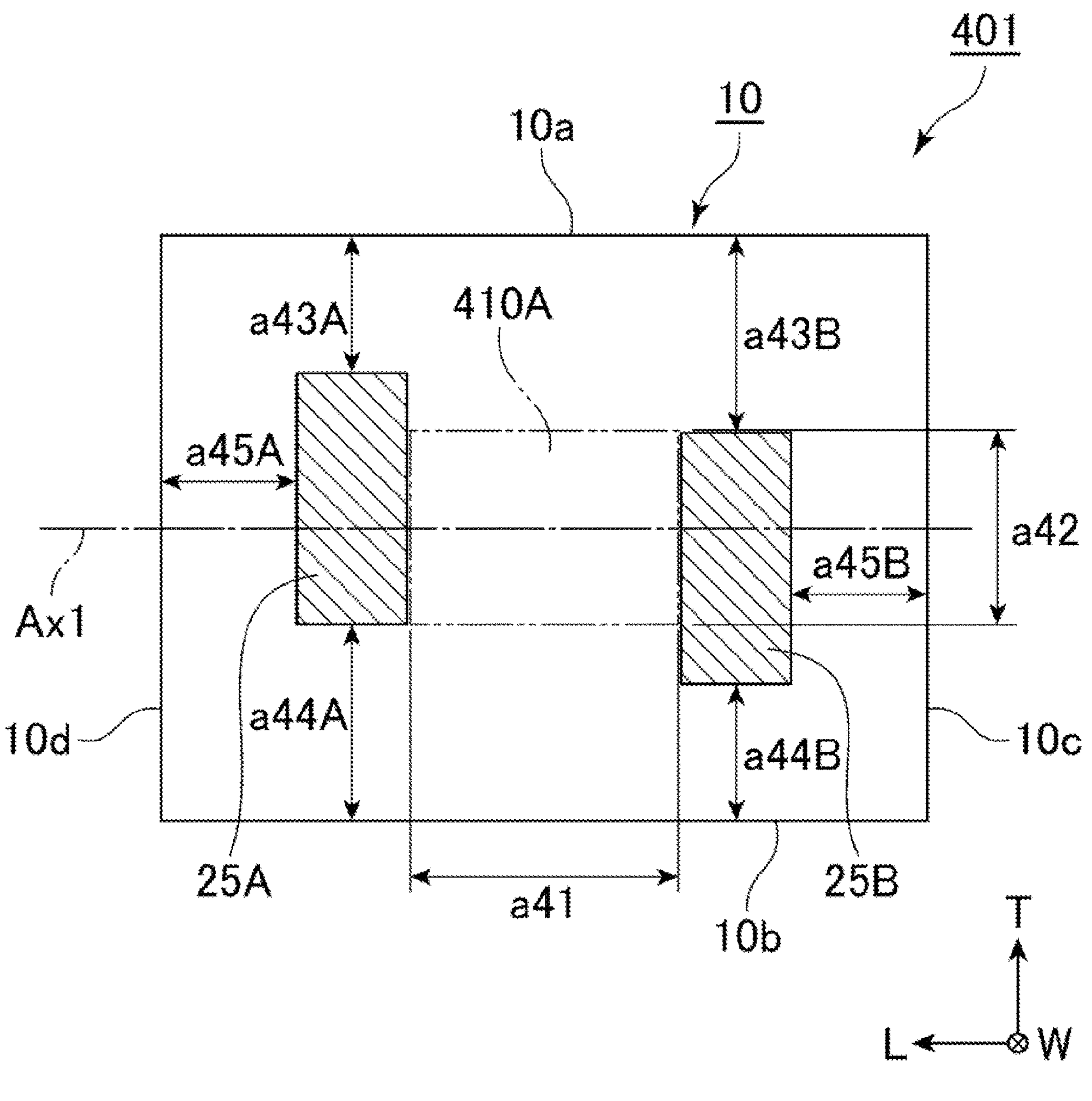
FIG. 11 is a perspective view of the inductor array according to another embodiment of the invention.

An inductor array 401 according to one or more embodiments of the invention will now be described with reference to FIG. 11. FIG. 11 is a sectional view schematically showing a section of the inductor array 401 cut along the plane perpendicular to the bottom surface 10*b* of the base body 10 (i.e., the reference plane). The inductor array 401 is different from the inductor array 1 in the arrangement of the internal conductors 25A and 25B in the base body 10. The following description does not mention the common features shared between the inductor arrays 401 and 1.

As shown, the internal conductor 25A is spaced apart from the top surface 10*a*, the bottom surface 10*b*, and the second end surface 10*d* of the base body 10 by the distances a43A, a44A, and a45A, respectively. The internal conductor 25A is positioned closer to the top surface 10*a* of the base body 10 than to the bottom surface 10*b*. Therefore, the distance a44A is larger than the distance a43A.

The internal conductor 25B is spaced apart from the top surface 10*a*, the bottom surface 10*b*, and the first end surface 10*c* of the base body 10 by the distances a43B, a44B, and a45B, respectively. The internal conductor 25B is positioned closer to the bottom surface 10*b* of the base body 10 than to the top surface 10*a*. Therefore, the distance a43B is larger than the distance a44B. In addition, the distance a43A between the internal conductor 25A and the top surface of the base body 10 is smaller than the distance a43B between the internal conductor 25B and the top surface of the base body 10.

The base body 10 includes an inter-conductor region 410A. The inter-conductor region 10A refers to the region of the base body 10 positioned between the internal conductor 25A and the internal conductor 25B and overlapping with both the internal conductor 25A and the internal conductor 25B as viewed from the reference axis direction along the reference axis Ax1 (i.e., as viewed from the L-axis direction). The dimension of the section of the inter-conductor region 410A in the reference axis direction along the reference axis Ax1 (L-axis direction) is referred to as the first reference axis direction dimension a41, and the dimension of the section of the inter-conductor region 410A in the orthogonal direction orthogonal to the reference axis Ax1 (T-axis direction) is referred to as the first orthogonal direction dimension a42. The section of the inter-conductor region 410A refers to the section of the inter-conductor region 410A cut along the plane extending through the reference axis Ax1 and perpendicular to the bottom surface 10*b* (i.e., the reference plane). In the inductor array 1, the first orthogonal direction dimension a2 of the inter-conductor region 10A is equal to the dimension b2 of the internal conductor 25A in the direction perpendicular to the reference axis direction. By contrast, in the inductor array 401, the internal conductor 25B is shifted by a shift width toward the negative side in the T-axis direction relative to the internal conductor 25A, and therefore, the first orthogonal direction dimension a42 of the inter-conductor region 410A is smaller than the dimension b2 of the internal conductor 25A in the direction perpendicular to the reference axis direction. The shift width equals to a43B-a43A, and thus the first orthogonal direction dimension a42 of the inter-conductor region 410A is smaller than the dimension b2 of the internal conductor 25A in the direction perpendicular to the reference axis direction by (a43B-a43A).

In the inductor array 401, the first aspect ratio of the inter-conductor region 410A is defined as the ratio of the first orthogonal direction dimension a42 to the first reference axis direction dimension a41 (a42/a41). In one or more embodiments of the invention, the first aspect ratio of the inter-conductor region 410A (a42/a41) is less than 1. Thus, the magnetic flux generated when the electric current flowing through the internal conductor 25A varies is unlikely to reach the internal conductor 25B, and therefore, the magnetic coupling between the inductors included in the inductor array 401 can be reduced.

In one or more embodiments of the present invention, the first reference axis direction dimension a41 of the inter-conductor region 410A is less than double the shortest distance between the internal conductor 25A and the surface of the base body 10 in the reference plane. Thus, the inductor array 401 can have a small dimension in the reference axis direction and thus have a small mounting area. In the inductor array 401, the internal conductor 25A is positioned closer to the top surface 10*a* of the base body 10 than is the middle of the base body 10 in the T-axis direction. Therefore, the distance a43A between the internal conductor 25A and the top surface 10*a* of the base body 10 is smaller than the distance a44A between the internal conductor 25A and the bottom surface 10*b* of the base body 10. The first reference axis direction dimension a41 of the inter-conductor region 410A is less than double the distance a43A, which is the smaller of the distances a43A and a44A. Therefore, as compared to the embodiments in which the internal conductor 25*a* is positioned at the middle of the base body 10 in the T-axis direction, the distance between the internal conductor 25A and the internal conductor 25B can be smaller, and thus the inductor array can have a smaller dimension in the reference axis direction. In the inductor array 401, the distance between the internal conductor 25A and the internal conductor 25B is less than double the distance a43A. However, since the internal conductor 25B is shifted by the shift width from the internal conductor 25A in the T-axis direction, the length of the magnetic path encircling both the internal conductor 25A and the internal conductor 25B is enlarged by the shift width. Therefore, in the inductor array 401, the distance between the internal conductor 25A and the internal conductor 25B is small, but the internal conductor 25A and the internal conductor 25B are at different levels in the T-axis direction, and thus the magnetic coupling between the internal conductor 25A and the internal conductor 25B can be reduced.

The Inventor made simulation to compare the ratio of the first aspect ratio to the second aspect ratio with the coupling coefficient for each of the inductor arrays 1, 401. For inductor array 1, four types of inductor arrays were input to a simulator. These inductor arrays were denoted by sample numbers S11 to S14 and were each provided with values shown in Table 1 for the first reference axis direction dimension a1 and the first orthogonal direction dimension a2 of the inter-conductor region 10A and the dimensions b1, b2 of the internal conductors 25A, 25B. The simulator calculated the self-inductance of the internal conductor 25A and the mutual inductance between the internal conductors 25A, 25B for these four types of inductor arrays. The coupling coefficient k between the internal conductors 25A, 25B was calculated based on the self-inductance and the mutual inductance. Table 2 shows the self-inductance (L), the mutual inductance (M), and the coupling coefficient calculated for each of the inductor arrays. Table 1 also includes the first aspect ratio AR1, the second aspect ratio AR2, and the ratio R1 of the first aspect ratio to the second aspect ratio.

TABLE 1

| # | a1 [μm] | a2 [μm] | AR1 (=a2/a1) | b1 [μm] | b2 [μm] | AR2 (=b2/b1) | R1 (=AR1/AR2) |
|---|---|---|---|---|---|---|---|
| S11 | 400 | 300 | 0.75 | 100 | 300 | 3.00 | 0.25 |
| S12 | 350 | 200 | 0.57 | 150 | 200 | 1.33 | 0.43 |
| S13 | 300 | 150 | 0.50 | 200 | 150 | 0.75 | 0.67 |
| S14 | 200 | 100 | 0.50 | 300 | 100 | 0.33 | 1.50 |

TABLE 2

| # | L [nH] | M [nH] | k = M/L |
|---|---|---|---|
| S11 | 9.43 | 0.65 | 0.069 |
| S12 | 11.00 | 0.88 | 0.080 |
| S13 | 11.13 | 1.02 | 0.092 |
| S14 | 10.00 | 1.26 | 0.126 |

For inductor array 401, eight types of inductor arrays were input to a simulator. These inductor arrays were denoted by sample numbers S21 to S28 and were each provided with values shown in Table 3 for the first reference axis direction dimension a41 and the first orthogonal direction dimension a42 of the inter-conductor region 10A and the dimensions b1, b2 of the internal conductors 25A, 25B. The simulator calculated the self-inductance of the internal conductor 25A and the mutual inductance between the internal conductors 25A, 25B for these eight types of inductor arrays. The coupling coefficient k between the internal conductors 25A, 25B was calculated based on the self-inductance and the mutual inductance. Table 4 shows the self-inductance (L), the mutual inductance (M), and the coupling coefficient calculated for each of the inductor arrays. Table 3 also includes the first aspect ratio AR1, the second aspect ratio AR2, the ratio R1 of the first aspect ratio to the second aspect ratio, and the shift width Z being the difference between the dimension b2 and the dimension a2. As shown in FIG. 11, the internal conductor 25B is shifted in the T-axis direction relative to the internal conductor 25A. The shift width Z represents the shift width by which the internal conductor 25B is shifted relative to the internal conductor 25A.

TABLE 3

| # | a41 [μm] | a42 [μm] | AR1 (=a42/a41) | b1 [μm] | b2 [μm] | AR2 (=b2/b1) | R1 (=AR1/AR2) | Z (=b2 − a42) |
|---|---|---|---|---|---|---|---|---|
| S21 | 400 | 250 | 0.63 | 100 | 300 | 3.00 | 0.21 | 50 |
| S22 | 400 | 200 | 0.50 | 100 | 300 | 3.00 | 0.17 | 100 |
| S23 | 350 | 150 | 0.43 | 150 | 200 | 1.33 | 0.32 | 50 |
| S24 | 350 | 100 | 0.29 | 150 | 200 | 1.33 | 0.21 | 100 |
| S25 | 350 | 50 | 0.14 | 150 | 200 | 1.33 | 0.11 | 150 |
| S26 | 300 | 100 | 0.33 | 200 | 150 | 0.75 | 0.44 | 50 |
| S27 | 300 | 50 | 0.17 | 200 | 150 | 0.75 | 0.22 | 100 |
| S28 | 200 | 50 | 0.25 | 300 | 100 | 0.33 | 0.75 | 50 |

TABLE 4

| # | L [nH] | M [nH] | k = M/L |
|---|---|---|---|
| S21 | 9.42 | 0.60 | 0.064 |
| S22 | 8.47 | 0.53 | 0.063 |
| S23 | 11.00 | 0.83 | 0.075 |
| S24 | 11.00 | 0.67 | 0.061 |
| S25 | 10.44 | 0.61 | 0.058 |
| S26 | 11.13 | 0.97 | 0.087 |
| S27 | 11.13 | 0.81 | 0.073 |
| S28 | 9.71 | 1.03 | 0.106 |

Figure 12:
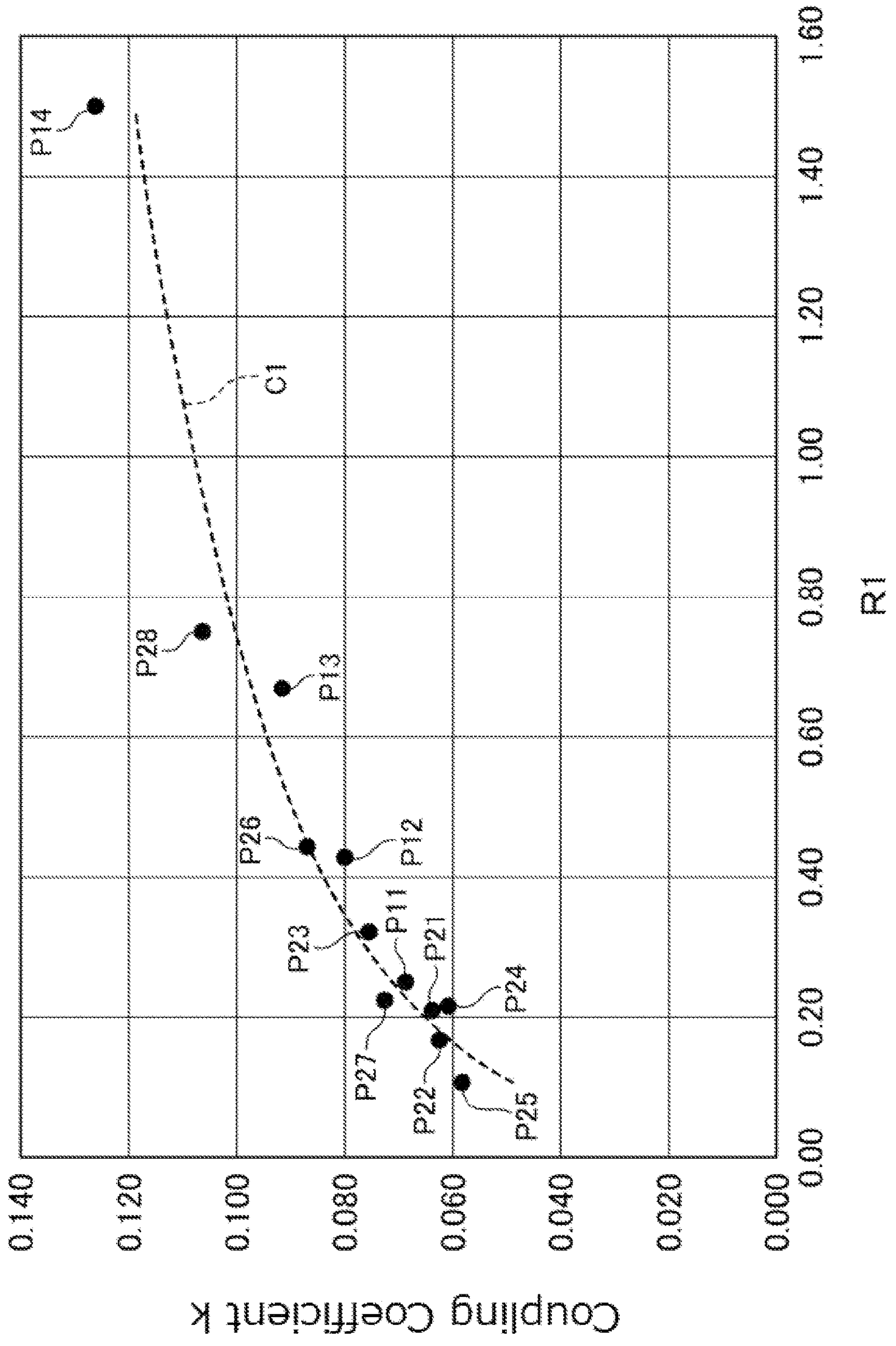
FIG. 12 is a graph showing results of simulation of inductor characteristics performed on an inductor array which is an implementation example of the invention.

FIG. 12 is a graph showing results of simulating inductor characteristics for samples S11 to S14 and S21 to S28. In FIG. 12, the horizontal axis indicates the ratio R1 of the first aspect ratio AR1 to the second aspect ratio AR2, and the vertical axis indicates the coupling coefficient k. In FIG. 12, the plotted points P11 to P14 and P21 to P28 indicate the respective values of the coupling coefficient calculated in the above simulation for the samples S11 to S14 and S21 to S28, and the line C1 represents an approximate curve based on the points P11 to P14 and the P21 to P28.

As shown in the graph of FIG. 12, the coupling coefficient is not higher than 0.2 for all the samples. This simulation result revealed the tendency of the coupling coefficient lowering as the ratio R1 of the first aspect ratio to the second aspect ratio is smaller. In particular, when the ratio R1 is smaller than 0.75, the coupling coefficient can be 0.1 or lower. Thus, when the dimensions a1, a2, b1, b2 are set such that the ratio R1 is smaller than 0.75, the coupling coefficient between the internal conductors 25A, 25B included in the inductor arrays 1, 401 can be lower than 0.1.

Next, a description is given of an example method of manufacturing the inductor array 1 according to one embodiment of the present invention. To describe the manufacturing method, FIG. 2 will be referred to as necessary. In one or more embodiments of the invention, the inductor array 1 is produced by a sheet lamination method in which magnetic sheets are stacked together. The first step of the sheet lamination method for producing the inductor array 1 is to prepare the magnetic sheets. The magnetic sheets are, for example, made from a slurry obtained by mixing and kneading a resin and metal magnetic particles of a soft magnetic material. The slurry is molded into the magnetic sheets using a sheet molding machine such as a doctor blade sheet molding machine. The resin mixed and kneaded together with the metal magnetic particles may be, for example, a polyvinyl butyral (PVB) resin, an epoxy resin, or any other resin materials having an excellent insulation property.

The magnetic sheets are cut into a predetermined shape. Next, a conductive paste is applied to the magnetic sheets cut into a predetermined shape by a known method such as screen printing, thereby forming a plurality of unfired conductor patterns that will later form the internal conductors 25A and 25B after firing. The conductive paste is made by mixing and kneading, for example, Ag, Cu, or alloys thereof and a resin.

In the way described above, the magnetic sheets having the unfired conductor patterns formed thereon and the unfired vias formed therein are prepared, and a mother laminate is prepared by stacking together these magnetic sheets and magnetic sheets having no conductors therein or thereon. The magnetic sheets having no conductors formed therein or thereon can contribute to adjust the distance between the internal conductors 25A and 25B.

Next, the mother laminate is diced using a cutter such as a dicing machine or a laser processing machine to obtain a chip laminate.

Next, the chip laminate is subjected to heat treatment at a temperature of 600° C. to 850° C. for a duration of 20 to 120 minutes. This heat treatment degreases the chip laminate, and the magnetic sheets and the conductor paste are fired to obtain the base body 10 that includes the internal conductors 25A and 25B thereinside. If the magnetic sheets contain a thermosetting resin, the thermosetting resin may be cured by performing a heat treatment on the chip laminate at a lower temperature. This cured resin serves as the binder that binds together the metal magnetic particles contained in the magnetic sheets. The heat treatment at a lower temperature is performed at a temperature of 100° C. to 200° C. for a duration of approximately 20 to 120 minutes, for example.

Following the heat treatment, a conductive paste is applied to the surface of the chip laminate (that is, the base body 10) to form the external electrodes 21A, 22A, 21B and 22B. In the above-described manner, the inductor array 1 is obtained. The inductor arrays 101, 201 and 301 can be made using the same manufacturing method as the inductor array 1.

The manufacturing method described above is susceptible of omitting a part of the steps, adding steps not explicitly referred to, and/or reordering the steps. A procedure subjected to such omission, addition, or reordering is also included in the scope of the present invention unless diverged from the purport of the present invention.

The method of manufacturing the inductor array 1 is not limited to the method described above. The inductor array 1 may be produced by a lamination method other than the sheet lamination method (e.g., the printing lamination method), the thin film process, the compression molding process, or other known methods.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. An inductor array comprising:

a magnetic base body having a first surface, a second surface opposed to the first surface, and a third surface connecting between the first surface and the second surface;

a plurality of internal conductors having a same shape and arranged within the magnetic base body along a reference axis extending through the first surface and the second surface;

a plurality of first external electrodes provided on the magnetic base body so as to be in contact at least with the third surface, each of the plurality of first external electrodes being connected to one end of associated one of the plurality of internal conductors; and a plurality of second external electrodes provided on the magnetic base body so as to be in contact at least with the third surface, each of the plurality of second external electrodes being connected to the other end of associated one of the plurality of internal conductors, wherein the plurality of internal conductors include a first internal conductor and a second internal conductor disposed adjacent to the first internal conductor, and the magnetic base body includes an inter-conductor region disposed between the first internal conductor and the second internal conductor and overlapping with both the first internal conductor and the second internal conductor as viewed from a reference axis direction along the reference axis, wherein the inter-conductor region has a first section cut along a reference plane including the reference axis and perpendicular to the third surface, and a first reference axis direction dimension of the first section in the reference axis direction is less than double a shortest distance between the first internal conductor and a surface of the magnetic base body in the reference plane, wherein a first aspect ratio of the first section is less than 1, the first aspect ratio being a ratio of a first orthogonal direction dimension in an orthogonal direction orthogonal to the reference axis to the first reference axis direction dimension, and wherein the first internal conductor has a second section cut along the reference plane, and a second orthogonal direction dimension of the second section in the orthogonal direction is larger than the first orthogonal direction dimension.

2. The inductor array of claim 1, wherein the first internal conductor has a second section cut along the reference plane, and a second orthogonal direction dimension of the second section in the orthogonal direction is equal to the first orthogonal direction dimension.

3. The inductor array of claim 2, wherein the magnetic base body has a fourth surface opposed to the third surface, and wherein a distance between the first internal conductor and the fourth surface is equal to a distance between the second internal conductor and the fourth surface.

4. The inductor array of claim 3, wherein the first reference axis direction dimension is equal to or larger than the distance between the first internal conductor and the fourth surface.

5. The inductor array of claim 1, wherein the magnetic base body has a fourth surface opposed to the third surface, and wherein a distance between the first internal conductor and the fourth surface is smaller than a distance between the second internal conductor and the fourth surface.

6. The inductor array of claim 1, wherein the first internal conductor has a second section cut along the reference plane, and the first aspect ratio is smaller than a second aspect ratio of the second section, the second aspect ratio being a ratio of a second orthogonal direction dimension in the orthogonal direction to a second reference axis direction dimension in the reference axis direction.

7. The inductor array of claim 6, wherein the second aspect ratio is larger than 1.

8. The inductor array of claim 1, wherein a magnitude of a coupling coefficient representing magnetic coupling between the first internal conductor and the second internal conductor is less than 0.2.

9. The inductor array of claim 8, wherein a magnitude of a coupling coefficient representing magnetic coupling between the first internal conductor and the second internal conductor is less than 0.1.

10. The inductor array of claim 1, wherein the magnetic base body has a relative magnetic permeability of 100 or less.

11. A circuit board comprising the inductor array of claim 1.

12. An electronic device comprising the circuit board of claim 11.

* * * * *